(12) United States Patent
Stone

(10) Patent No.: US 11,000,978 B2
(45) Date of Patent: *May 11, 2021

(54) GAP FILLER ROLLER ASSEMBLY

(71) Applicant: THE BOEING COMPANY, Chicago, IL (US)

(72) Inventor: Paul Reed Stone, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 248 days.

This patent is subject to a terminal disclaimer.

(21) Appl. No.: 16/178,930

(22) Filed: Nov. 2, 2018

(65) Prior Publication Data

US 2019/0389098 A1 Dec. 26, 2019

Related U.S. Application Data

(63) Continuation-in-part of application No. 16/018,538, filed on Jun. 26, 2018, now Pat. No. 10,875,621.

(51) Int. Cl.
| | |
|---|---|
| *B29C 43/46* | (2006.01) |
| *B29C 70/50* | (2006.01) |
| *B29C 43/22* | (2006.01) |
| *B29L 31/00* | (2006.01) |
| *B29K 105/00* | (2006.01) |

(52) U.S. Cl.
CPC ............ *B29C 43/46* (2013.01); *B29C 43/224* (2013.01); *B29C 70/504* (2013.01); *B29C 2043/467* (2013.01); *B29K 2105/256* (2013.01); *B29L 2031/003* (2013.01)

(58) Field of Classification Search
CPC ........ B29C 43/00; B29C 43/46; B29C 70/504
See application file for complete search history.

(56) References Cited

U.S. PATENT DOCUMENTS

| | | | | |
|---|---|---|---|---|
| 5,393,475 | A * | 2/1995 | Murasaki | A44B 18/0049 264/167 |
| 9,855,702 | B1 * | 1/2018 | Olberg | B29C 70/504 |
| 2003/0185927 | A1 * | 10/2003 | Morikawa | A21C 3/025 425/363 |

(Continued)

OTHER PUBLICATIONS

Notice of Allowance for U.S. Appl. No. 16/018,538 dated Oct. 2, 2020.

*Primary Examiner* — Nahida Sultana
(74) *Attorney, Agent, or Firm* — Marshall, Gerstein & Borun LLP

(57) ABSTRACT

Roller assembly for forming adjacent curved surfaces in a composite gap filler member includes a first roller supported by a first support member, a second roller supported by a second support member and a support including a surface. First roller and the second roller are in contact with one another and in contact with the surface. With rotation of the first roller about a third axis and with at least one of the first roller or second roller moved relative to the other such that the first roller maintains contact with the second roller and the first roller and the second roller maintain contact with the surface, such that the first roller, second roller and the surface form an aperture having a first curved side having a first radius adjacent to a second curved side having a second radius wherein the first radius and second radius are unequal.

20 Claims, 17 Drawing Sheets

(56) References Cited

U.S. PATENT DOCUMENTS

| | | | | |
|---|---|---|---|---|
| 2008/0121122 A1* | 5/2008 | Kubik | .................... | D21G 1/022 |
| | | | | 100/336 |
| 2009/0071592 A1* | 3/2009 | Benson | ................ | B29C 70/504 |
| | | | | 156/163 |
| 2012/0223168 A1* | 9/2012 | Kirchhofer | ............. | B29C 43/46 |
| | | | | 241/65 |
| 2014/0141193 A1* | 5/2014 | Sundermann | ......... | D06M 15/70 |
| | | | | 428/80 |
| 2014/0290866 A1* | 10/2014 | Brufau Redondo | .. | B29C 70/386 |
| | | | | 156/535 |
| 2015/0190951 A1* | 7/2015 | Takamura | ................ | B21B 1/22 |
| | | | | 425/294 |
| 2016/0271890 A1* | 9/2016 | Rihei | .................... | B29C 43/305 |
| 2017/0165881 A1* | 6/2017 | Shinobudani | ........... | B29C 43/24 |
| 2019/0126520 A1* | 5/2019 | Hodsdon | ................ | B29C 43/245 |
| 2019/0126522 A1* | 5/2019 | Hodsdon | ............... | B29C 43/245 |

* cited by examiner

168

170 — POSITIONING A FIRST ROLLER AGAINST COMPOSITE MATERIAL WHEREIN: THE FIRST ROLLER IS SUPPORTED BY A FIRST SUPPORT MEMBER; THE FIRST ROLLER ROTATES RELATIVE TO THE FIRST SUPPORT MEMBER ABOUT A FIRST AXIS OF ROTATION; AND THE FIRST SUPPORT MEMBER IS ROTATABLE ABOUT A THIRD AXIS OF ROTATION WHICH EXTENDS IN A DIRECTION TRANSVERSE TO THE FIRST AXIS OF ROTATION;

172 — POSITIONING A SECOND ROLLER AGAINST COMPOSITE MATERIAL WHEREIN: THE SECOND ROLLER IS SUPPORTED BY A SECOND SUPPORT MEMBER;
THE SECOND ROLLER ROTATES RELATIVE TO THE SECOND SUPPORT MEMBER ABOUT A SECOND AXIS OF ROTATION; AND THE SECOND SUPPORT MEMBER IS ROTATABLE ABOUT A FOURTH AXIS OF ROTATION WHICH EXTENDS IN A DIRECTION TRANSVERSE TO THE SECOND AXIS OF ROTATION;

174 — PULLING THE COMPOSITE MATERIAL PAST THE FIRST AND SECOND ROLLERS WHEREIN THE FIRST ROLLER ROTATES ABOUT THE FIRST AXIS OF ROTATION AND THE SECOND ROLLER ROTATES ABOUT THE SECOND AXIS OF ROTATION; AND

176 — ROTATING THE FIRST AXIS OF ROTATION ABOUT THE THIRD AXIS OF ROTATION AND ROTATING THE SECOND AXIS OF ROTATION ABOUT THE FOURTH AXIS OF ROTATION

FIG. 11

GAP FILLER ROLLER ASSEMBLY

CROSS-REFERENCE TO RELATED APPLICATIONS

This application is a continuation-in-part of U.S. patent application Ser. No. 16/018,538 (filed Jun. 26, 2018), the entirety of which is incorporated by reference herein.

FIELD

This disclosure relates to forming composite gap filler, and more particularly, to an assembly for forming a curved surface configuration along adjacent sides of the composite gap filler.

BACKGROUND

Gap fillers are used in conjunction with a wide variety of structures. In an example gap fillers are used in association with a stringer used in reinforcing portions of a skin structure of an aircraft. The stringer, in one example, is constructed of pair of c-shaped channels. Each c-shaped channel has a web portion with a flange portion extending from each end of each web portion. The flanges of each web portion extend away from the web portion with a corner formed between each flange and its corresponding web portion with an outer surface of each corner forming a curved surface.

With the web portion of each of the two c-shaped channels positioned in abutting relationship with one another and secured together a stringer is formed. The flanges of a first end of a stringer are aligned with and extend in opposite directions from one another. On an opposing second end of the stringer the flanges are aligned with and extend in opposite directions from one another. As a result, on the first end of the stringer the outer surface of the corners extending between the flanges and their corresponding web portions form curved surfaces which are positioned adjacent to one another and similarly the outer surfaces of the corners extending between the flanges and their corresponding web portions form curved surfaces on the opposing second end of the stringer are positioned adjacent to another.

With the first end of the stringer positioned against a skin, the two adjacent curved surfaces associated with the first end of the stringer and the skin form a gap, wherein the gap extends along the length of the first end of the stringer. With the opposing second end of the stringer having a cap structure positioned in overlying relationship with the opposing second end of the stringer, the two adjacent curved surfaces associated with the opposing second end of the stringer and the cap structure form a gap wherein the gap extends along the length of the opposing second end of the stringer.

A composite gap filler is needed to be positioned in each of these gaps positioned on the first end and the second opposite end of the stringer to enhance the strength of the stringer and to reduce the amount of material needed to construct the stringer in providing support to the skin structure. The gap formation in each instance has three sides as previously discussed. Two adjacent sides are curved and can change in radius of curvature as the gap progresses along the stringer as well as the overall size of the gap. The changes in the gap configuration occurs as load demands change along the stringer changing the size of the stringer and changing the radius of curvature of the of the outside curved surfaces of the corners formed between the flanges and their corresponding web portion. As a result, gap fillers are fabricated to accommodate these changes to the overall size of the gap and the change in radius of the adjacent curved sides of the gap.

In one example, the change in size of the stringer can occur in the wing of the aircraft. The load on the stringer is greater proximate to the fuselage than at the end of the wing wherein the size stringer and the size of the gap filler may be the largest and the radius of curvature for the gap and the gap filler may be at their greatest dimension. The stringer and the gap filler generally diminish in size as does the radius of curvature of the gap filler as load demands decrease as each extend away from the fuselage location toward the outboard end of a wing. However, as the stringer and gap filler approach the location of an engine mounted on the wing, the load demand increases and the stringer and gap filler are increased in size as well as the radius of curvature of the gap and the gap filler increase in dimension. As the stringer and gap filler extend beyond the location of the engine toward the outboard end of the wing, the load demand decreases on the wing and the stringer and gap filler consequently decrease in size so as does the radius of curvature of the gap and the gap filler. In this example, as the stringer increases in size so does the gap and the gap filler as well as the dimension of the radius of curvature of the adjacent gap sides defined by the adjacent curved external surfaces extending between the flange and its corresponding web portion and the dimension of the radius of curvature of adjacent sides of the gap filler. As the stringer decreases in size so does the gap and the gap filler as well as the dimension of the radius of curvature of the adjacent gap sides defined by the adjacent curved external surfaces extending between the flange and its corresponding web portion and the dimension of the radius of curvature of adjacent sides of the gap filler. As a result, there is a need to increase and decrease the size of the gap filler as well as the radius of curvature of each of the two adjacent sides of the gap filler so as to optimize the fit of the gap filler within the gap as the gap extends along the length of the stringer. Optimally fitting the gap filler with the gap optimizes the stringer performance.

Particular difficulties have arisen in fabricating composite gap fillers. In one instance, where the gap filler material is pulled through guillotine dies which impart a curve to the gap filler on adjacent sides of the gap filler, it is problematic to fabricate the gap filler from a smaller sized gap filler to a larger sized gap filler. In increasing the dimension of the gap filler, additional tape of laminate material is added to the existing gap filler, however the added tape of laminate material is not secured to the existing gap filler material being formed. With the addition of tape there is an increase in fibers within the gap filler. With the gap filler material experiencing a tension force being pulled through the rollers forming the gap filler, the added material is not secured and placed in tension. As a result, the added fibers tend to be scraped off by the guillotine dies in forming the adjacent sides of the gap filler being increased in size.

In other instances when a radius of curvature to the adjacent sides of the gap filler needs to be changed, guillotine dies or roller sizes are changed that impart a different radius of curvature. However, the newly installed roller immediately imparts a different radius of curvature to the gap filler causing an abrupt change to the surface of the adjacent curved sides of the gap filler. There is no transition provided in the surface of the gap filler with the changing of the radius of curvature. This changing of rollers took time and resulted in a non-continuous or abrupt surface change on the gap filler. This lack of transition in radius change on the gap filler did not optimize the fit of the gap filler with the gap it was intended to fill wherein the gap provided smooth transitions of change of radius of the adjacent sides of the gap. As a result, the performance of the stringer was not optimized.

There has been use of rollers that were changed in position such as the plane of the axis of rotation of the rollers relative to the gap filler being fabricated in order to change size and radius in the gap to be filled. Even though different sized rollers were not employed, a change was made in the position of the plane of the axis of rotation of the rollers relative to the gap filler to impart a different radius and size without a rotation of the axis of rotation of the rollers about an axis of rotation positioned transverse to the axis of rotation for each roller to provide for a transitional change in the radius of the gap filler.

There is a need for providing a gap filler fabrication assembly that will reliably form gap fillers regardless of whether the gap filler is increasing or decreasing in size along the length and the adjacent curved sides of the gap filler are increasing or decreasing in the radius of curvature of the adjacent curved sides of the gap filler. In addition, there is a need not to have the change in configuration of the gap filler drive stringer design. There is also a need to change the radius of the curvature of each of the adjacent sides of the gap filler as the gap filler is fabricated such that the gap filler results in having a transition between changes in radius of curvature along the surface of the gap filler without imparting non-continuous or abrupt surface changes on the gap filler surfaces provide different radii of curvature to adjacent sides of the gap filler. In addition, there is a need to provide an assembly and a method to make a quality reliable gap filler configuration so as not to impact aircraft assembly schedules.

SUMMARY

An example includes a roller assembly for forming adjacent curved surfaces in a composite gap filler member which includes a first roller is supported by a first support member wherein the first roller rotates relative to the first support member and second roller is supported by a second support member wherein the second roller rotates relative to the second support member. The first support member is rotatable about a third axis of rotation. The second support member is rotatable about a fourth axis of rotation. The roller assembly further includes a support which includes a surface wherein with the first roller and the second roller in contact with one another and in contact with the surface and with rotation of the first roller about the third axis of rotation and with at least one of the first roller or second roller is moved relative to other such that the first roller maintains contact with the second roller and the first roller and the second roller maintain contact with the surface, the first roller, second roller and the surface form an aperture. The aperture includes the first roller defining a first curved side of the aperture having a first radius and the second roller defines a second curved side of the aperture, adjacent to the first curved side, having a second radius such that the first radius and the second radius are unequal.

An example includes a method of forming adjacent curved surfaces in a composite gap filler member which includes a step of positioning a first roller, which is supported by a first support member in contact with a surface of a support, wherein the first roller rotates relative to the first support member and the first support member is rotatable about a third axis of rotation. The method further includes a step of positioning a second roller, which is supported by a second support member, in contact with the surface of the support and in contact with the first roller, wherein and the second roller rotates relative to the second support member and the second support member is rotatable about a fourth axis of rotation. The method further includes a step of pulling the composite material in contact with and past the first and second rollers wherein the first roller rotates and the second roller rotates. The method further includes a step of rotating the first support member and the first roller about the third axis of rotation and moving at least one of the first roller or second roller relative to other maintaining the first and second rollers in contact with one another and in contact with the surface. The first roller, the second roller and the surface of the support define an aperture. The first roller defines a first curved side of the aperture having a first radius and the second roller defines a second curved side of the aperture, adjacent to the first curved side, having a second radius such that the first radius and the second radius are unequal.

The features, functions, and advantages that have been discussed can be achieved independently in various embodiments or may be combined in yet other embodiments further details of which can be seen with reference to the following description and drawings.

BRIEF SUMMARY OF THE DRAWINGS

FIG. 11 is a flow chart of a method of forming adjacent curved surfaces in a composite gap filler member.

While various embodiments have been described above, this disclosure is not intended to be limited thereto. Variations can be made to the disclosed embodiments that are still within the scope of the appended claims.

DESCRIPTION

Figure 1:
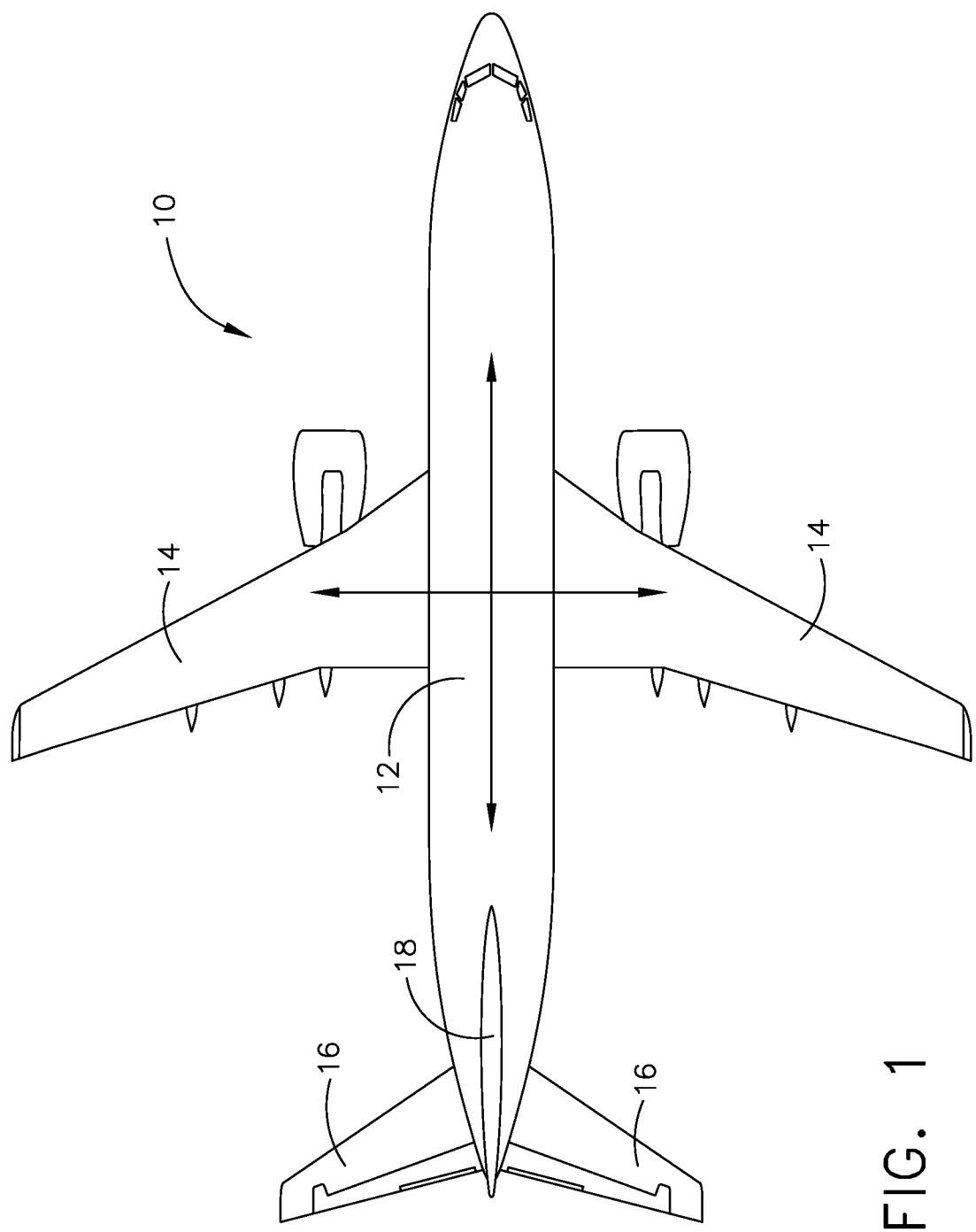
FIG. 1 is a plan view of an aircraft.

Stringers are reinforcement members fabricated to be secured to skin structures often used in aerospace construction. Stringers provide additional strength to a skin structure thereby avoiding the need to add additional laminates to the skin structure and adding corresponding additional weight to the skin structure. This skin stringer and structure is used in fabrication of aircraft such, as for example, aircraft 10, as seen in FIG. 1. Portions of aircraft 10 are constructed with a reinforced skin structure utilizing stringers such as, for example, fuselage 12, wings 14, horizontal stabilizers or tail wings 16 and vertical stabilizer 18. Stringers can take on any number of configurations and sizes depending on the load demands and space availability with respect to the portion of aircraft being constructed.

Figure 2:
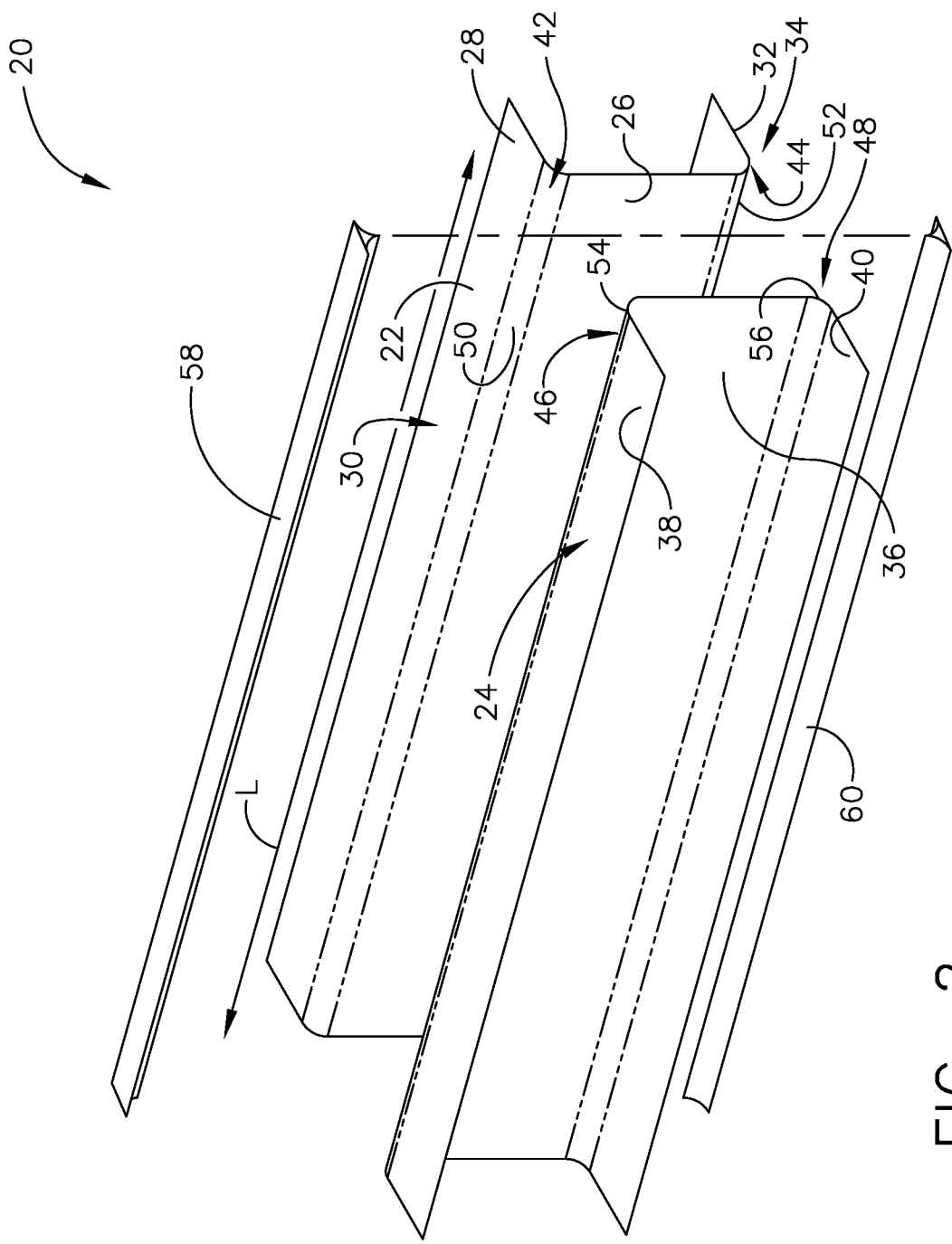
FIG. 2 is an exploded perspective view of a stringer with a first gap filler positioned extending along a first end of the stringer and a second gap filler positioned along an opposing second end of the stringer.

An example of a configuration for stringer 20 can be seen in FIG. 2 wherein stringer 20 is constructed of a pair of c-shaped channels including first and second c-shaped channels 22, 24. First c-shaped channel 22 has a first web portion 26 with a first flange 28 extending from first web portion 26 on first end 30 of stringer 20 and second flange 32 extending from first web portion 26 from second opposite end 34 of stringer 20. Second c-shaped channel 24 has second web portion 36 with first flange 38 extending from second web portion 36 on first end 30 of stringer 20 and second flange 40 extending from second web portion 36 on second opposite end 34 of stringer 20.

First flange 28 of first c-shaped channel 22 forms first corner 42 with first web portion 26 and second flange 32 of first c-shaped channel 22 forms second corner 44 with first web portion 26. Similarly, first flange 38 of second c-shaped channel 24 forms third corner 46 with second web portion 36 and second flange 40 of second c-shaped channel 24 forms fourth corner 48 with second web portion 36. Each of first and second corners 42, 44 have first curved surface 50 and second curved surface 52 respectively. Similarly each of third and fourth corners 46, 48 have third curved surface 54 and fourth curved surface 56 respectively.

With the first and second web portions 26, 36 positioned in abutting relationship with one another and secured together, stringer 20 is formed. First flange 28 and first flange 38 on first end 30 of stringer 20 are aligned with one another and extend in opposite directions from one another. As a result, first corner 42 and third corner 46 are positioned adjacent with one another with first curved surface 50 and third curved surface 54 positioned adjacent to one another. On an opposing second opposite end 34 of stringer 20, second flange 32 and second flange 40 are aligned with one another and extend in opposite directions from one another. As a result, second corner 44 and fourth corner 48 are positioned adjacent to one another with second curved surface 52 and fourth curved surface 56 positioned adjacent to one another.

With first end of stringer 20 positioned against a skin structure (not shown) in FIG. 2, the skin structure and first and third curved surfaces 50, 54 on the first end 30 of stringer 20 form a three sided gap (not shown) which extends along length L of stringer 20. First gap filler 58 is provided to fill the three sided gap which extends along first end 30 of stringer 20. With second opposite end 34 of stringer 20 having a cap structure (not shown) positioned in overlying relationship with the second opposite end 34 of stringer 20, the cap structure and second curved surface 52 and fourth curved surface 56 on second opposite end 34 of stringer 20 also form a three sided gap (not shown) which extends along length L of stringer 20. Second gap filler 60 is provided to fill the three sided gap which extends along length L of stringer 20 on second opposite end 34.

First and second gap fillers 58, 60 are needed to be positioned in each gap formed on the first end of stringer 20 and the gap formed on the second opposite end 34. First and second gap fillers 58, 60 are constructed of composite material as is in this example the first and second c-shaped channels 22 and 24. The gap fillers 58, 60 are needed to provide an optimal fit within the gap on the first end 30 and the second opposite end 34 and secure to all three sides of the gap providing stringer 20 the needed strength in providing support in this example to the skin structure (not shown). The size of stringer 20 and the size of the gap along the first end 30 and second opposite end 34 of stringer 20 can change in size depending on the load demands being placed on stringer 20. With the change in size of stringer 20, a resulting change occurs to the size of the gap and the radius of curvature of adjacent sides of the gap. As a result, the gap fillers 58, 60 to provide an optimal fit within the gap of stringer 20, the size of gap fillers 58, 60 need to correspondingly change in size and the adjacent curved sides of the gap fillers 58 and 59 need to change as well.

Figure 3:
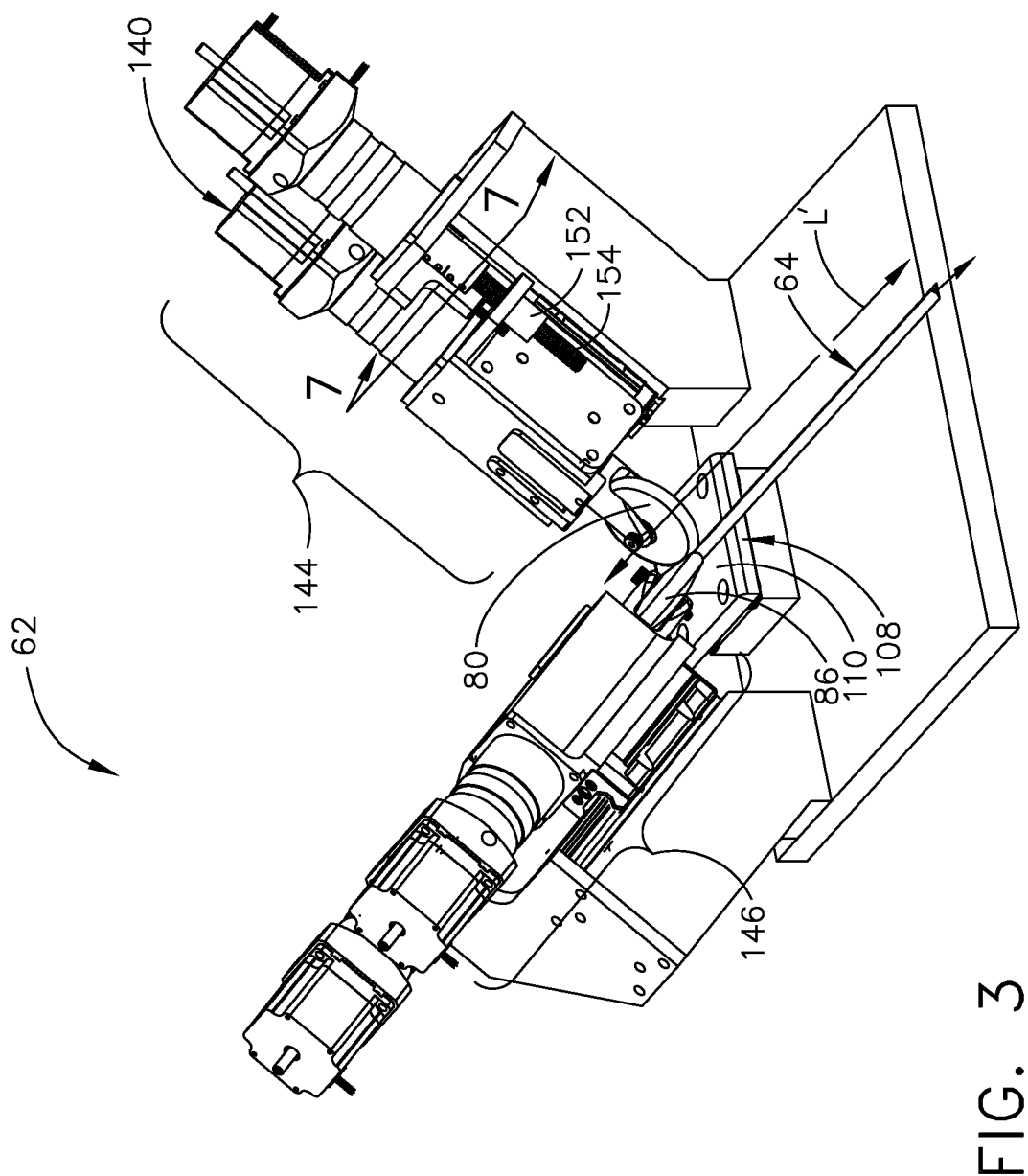
FIG. 3 is a perspective view of a roller assembly imparting a curved surface to adjacent sides of a gap filler along with a first embodiment of a support for the gap filler.
Figure 4:
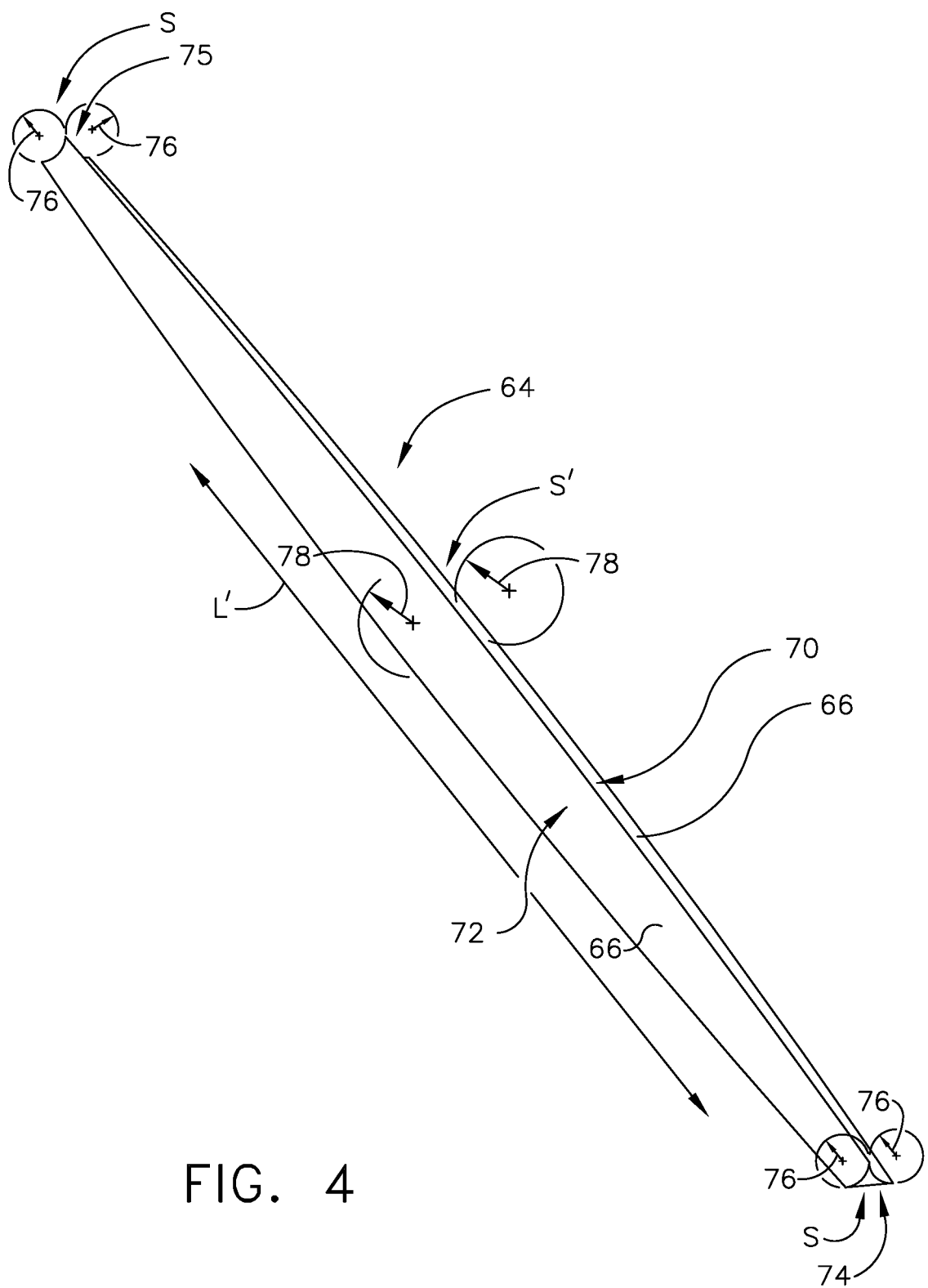
FIG. 4 is a perspective view of an example gap filler formed by the roller assembly in FIG. 3 wherein the dimension of the radius of each of the adjacent sides of the gap filler and size of the gap filler change as the gap filler progresses along a length of the gap filler from a first end to a second end of the gap filler.

Roller assembly 62, as shown in FIG. 3, provides for formation of gap filler member 64, as seen for example in FIG. 4 and earlier described, for example, as first and second gap fillers 58 and 60 wherein changes to size and to dimension of radius of adjacent sides of gap filler member 64 are needed for accommodating an appropriate fit with stringer 20 along length L of stringer 20. The formation of gap filler member 64, as seen in FIG. 4 for example, will be accomplished with roller assembly 62 providing smooth transitions along external surfaces 66, 68 of adjacent curved sides 70, 72 respectively of gap filler 64 as gap filler member 64 changes in size and adjacent curved sides 70, 72 change in radius of curvature along length L' of gap filler 64. For example, first size S of gap filler member 64 and adjacent curved sides 70, 72 have radius of curvature 76 at first end 74 of gap filler member 64. As gap filler member 64 extends along length L' gap filler 64 changes in size to an increased second size S' and increased second radius of curvature 78 of adjacent curved sides 70, 72. As will be discussed in further detail herein, the change in size of gap filler member 64 and the change in radius of curvature of adjacent curved sides 70, 72 will have a smooth transition with respect to external surfaces 66, 68 with application of roller assembly 62.

In the example shown in FIG. 4, gap filler member 64 transitions from second size S' back to a smaller first size S at second end 75 and transitions from second radius of curvature 78 of adjacent curved sides 70, 72 back to a smaller first radius of curvature 76 for adjacent curved sides 70, 72 at second end 75 of gap filler member 64. This example demonstrates a relatively symmetrical configuration of gap filler member 64 along length L' of gap filler 64. As will be appreciated herein, roller assembly 62 can transition adjacent curved sides 70, 72 to attain different sizes to gap filler 64 as desired along length L' of gap filler 64 and attain changes in radius of curvature of adjacent curved sides 70, 72 as desired along length L' of gap filler 64. The changing of size and radius of curvature of adjacent curved sides 70, 72 will be imparted to gap filler member 64 by roller assembly 62 with imparting a smooth transition of external surfaces 66, 68 along length L' of gap filler member 64 without placing abrupt changes in external surfaces 66, 68.

Figure 5:
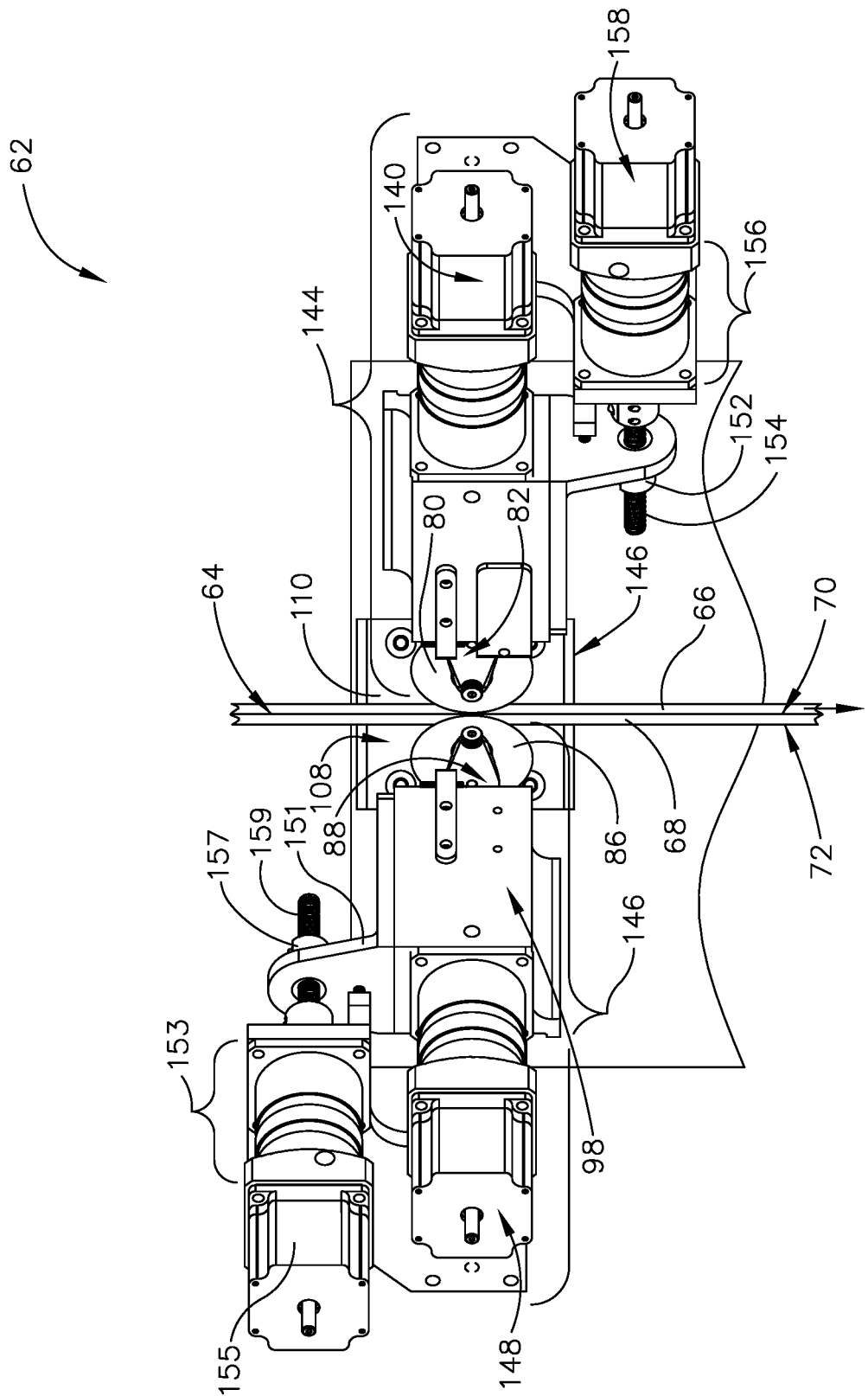
FIG. 5 is a top plan view of the roller assembly of FIG. 3.
Figure 6:
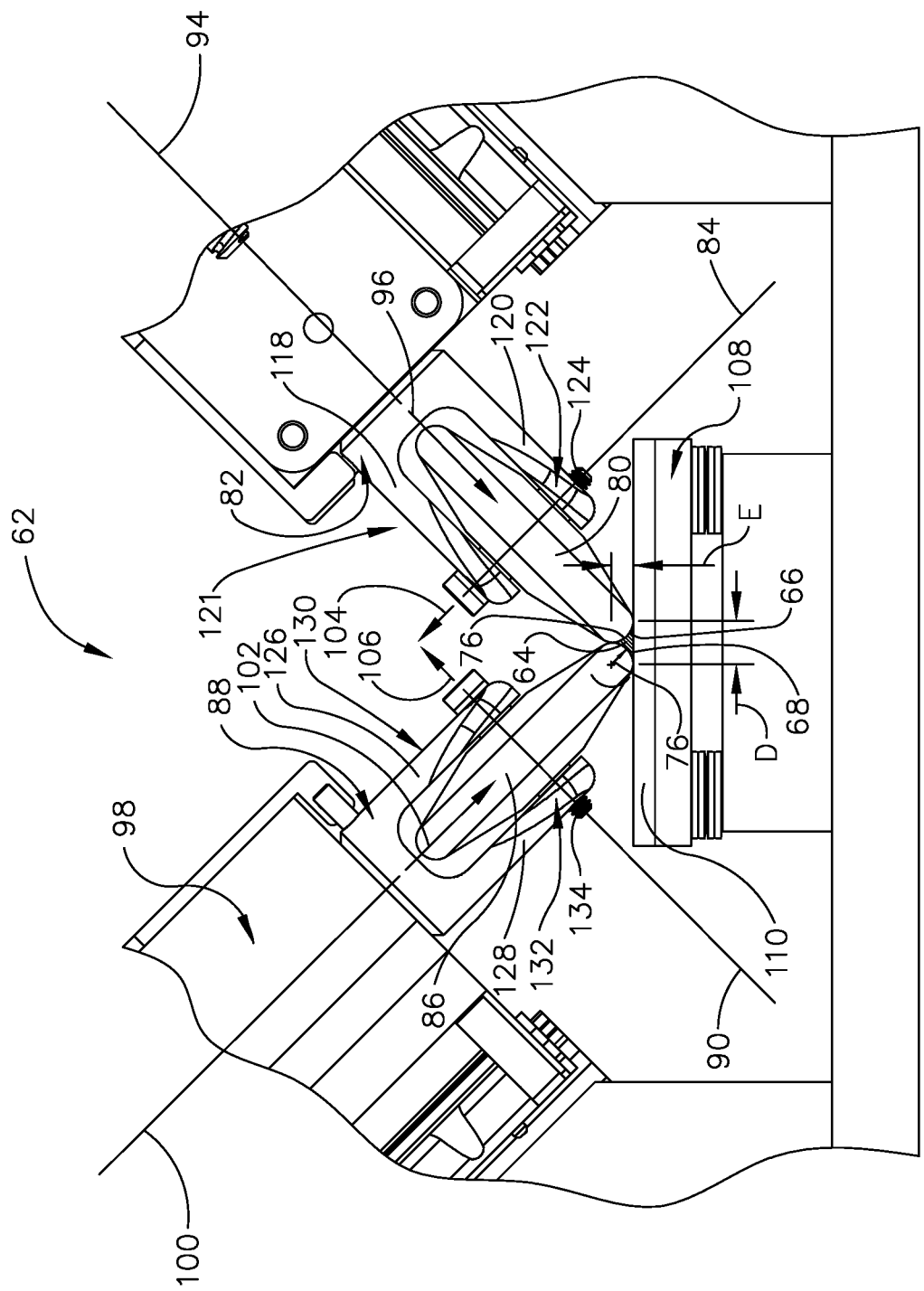
FIG. 6 is an enlarged partial front plan view of the roller assembly of FIG. 3 with gap filler in cross section passing through the rollers.

In referring to FIGS. 3 and 5-6, roller assembly 62 is shown with respect to imparting first size S and first radius of curvature 76 to gap filler 64 as described above and shown in FIG. 4. Roller assembly 62 can be constructed in a number of various constructions to accomplish imparting smooth transitions of size and radius of curvature to external surfaces 66, 68 of adjacent curved sides 70, 72 in forming gap filler member 64. One example of roller assembly 62 is shown herein as an example of a construction of an assembly that will accomplish the smooth transition of external surfaces 66, 68 of adjacent curved sides 70, 72 along gap filler 64 as size of gap filler member 64 changes and as radius of curvature of adjacent curved sides 70, 72 change along length L' of gap filler 64.

Figure 7:
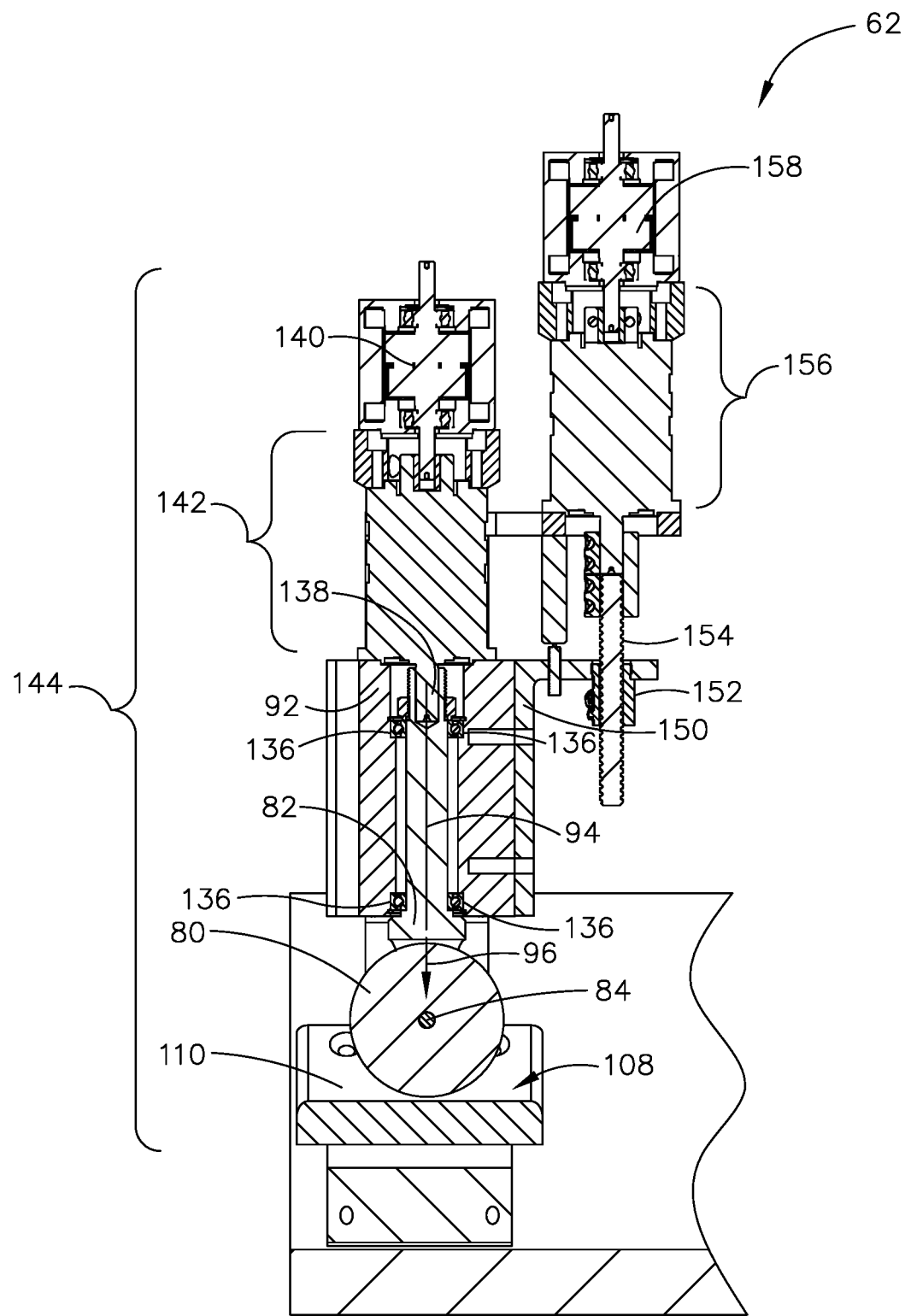
FIG. 7 is a cross section view of the roller assembly taken along line 7-7 in FIG. 3.

Roller assembly 62, as shown in FIGS. 3 and 5-7, forms adjacent external surfaces 66, 68 in composite gap filler member 64. Roller assembly 62 includes first roller 80 supported by first support member 82 wherein first roller 80 rotates relative to first support member 82 about first axis of rotation 84. Second roller 86 is supported by second support member 88 wherein second roller 86 rotates relative to second support member 88 about second axis of rotation 90. First support member 82, as seen in an example of roller assembly 62 in FIG. 7, is supported by first frame member 92 wherein first support member 82 rotates relative to first frame member 92 about third axis of rotation 94 and third axis of rotation 94 extends in direction 96 transverse to first axis of rotation 84. Second support member 88 is supported by second frame member 98 and is configured with second support member 88 as that of first support member 82 and first frame member 92 as shown in FIG. 7. Second support member 88 rotates relative to second frame member 98 about fourth axis of rotation 100, as seen in an example of roller assembly 62 in FIG. 6, and fourth axis of rotation 100 extends in direction 102 transverse to second axis of rotation 90 in similar configuration as first support member 82 rotates relative to first frame member 92 about third axis of rotation 94 and extends in direction 96 transverse to first axis of rotation 84, as shown in FIGS. 6 and 7.

As seen in FIG. 6, first axis of rotation 84 extends in first direction 104 and second axis of rotation 90 extends in second direction 106 wherein first and second directions 104, 106 extend in converging relationship toward one another. Third axis of rotation 94 extends in direction 96 and fourth axis of rotation 100 extends in direction 102 such that directions 96, 102 converge toward one another. In this embodiment, third axis of rotation 94 and fourth axis of rotation 100 converge in a transverse relationship toward one another and in this example at ninety degrees (90 deg.) relative to one another. First roller 80 is positioned in contact with second roller 86 as seen in FIG. 6 and as will be discussed herein first and second rollers 80, 86 will remain in contact with one another in different positions along a circumference of first roller 80 and second roller 86 as positions of first and second rollers 80, 86 are adjusted.

Roller assembly 62 further includes support 108 positioned relative to first and second rollers 80, 86 such that first and second rollers 80, 86 are in contact with support 108. In one example, support 108 as seen in FIGS. 3 and 5-9, includes slide block 110. Slide block 110 is constructed of material which has a low friction surface, which does not adversely affect the composite gap filler member 64 material, which includes a number of metallic or composite materials known to those who fabricate composite materials. Gap filler member 64 is pulled through converging first and second rollers 80, 86 across slide block 110 with first and second rollers 80, 86 imparting first and second curved sides 70, 72 to gap filler member 64 and first and second rollers 80, 86 are also in contact with slide block 110. A second example of support 108 is employed in roller assembly 62 as seen in FIG. 10. Support 108 shown in FIG. 10 includes conveyor assembly 112 such that belt member 114 of conveyor assembly 112 is positioned also in contact first and second rollers 80, 86 and with gap filler member 64 being pulled through converging first and second rollers 80, 86 first and second rollers 80, 86 impart first and second curved sides 70, 72 to gap filler member 64. Belt member 114 is similarly constructed of material such as slide block 110 as discussed above which is compatible for contact with composite material of which composite gap filler member 64 is constructed. With gap filler member 64 positioned on belt member 114 and gap filler member 64 being pulled through converging first and second rollers 80, 86, gap filler is positioned in contact with belt member 114. Belt member 114 travels along rollers 116 positioned to permit translational movement of belt member 114 relative to rollers 116 allowing belt member 114 to move along with gap filler member 64.

In referring to FIG. 6, in this example, first support member 82 includes first portion 118 and second portion 120 wherein first portion 118 of first support member 82 extends along first side 121 of first roller 80 and second portion 120 of first support member 82 extends along second side 122 of first roller 80. Further in this example, first axle member 124 includes a bolt member which extends along first axis of rotation 84 and is supported by first portion 118 of first support member 82, extends through first roller 80 and extends to and is supported by second portion 120 of first support member 82. Second support member 88 includes first portion 126 and second portion 128 wherein first portion 126 of second support member 88 extends along first side 130 of second roller 86 and second portion 128 of second support member 88 extends along second side 132 of second roller 86. Second axle member 134, which in this example includes a bolt member, extends along second axis of rotation 90 and is supported by the first portion 126 of second support member 88, extends through second roller 86 and extends to and is supported by second portion 128 of second support member 88.

In referring to FIG. 7, roller bearings 136 are positioned between first frame member 92 and first support member 82 permitting ease in rotation of first support member 82 about third axis of rotation 94. First support member 82 is connected to first rotatable drive shaft 138 for rotating first support member 82 about third axis of rotation 94. First motor 140, such as a step motor in this example, is connected to first rotatable drive shaft 138 through drive gears and transmission assembly 142 such that rotating first support member 82 rotates first axis of rotation 84 about third axis of rotation 94. The positions of first axis of rotation 84 with respect to third axis of rotation 94 is seen in FIG. 6. This construction of first roller rotational assembly 144 associated with first roller 80 is similar to that of the construction of second roller rotational assembly 146 associated with second roller 86 positioned across from first roller rotational assembly 144 with respect to support 108, as seen in FIGS. 3 and 5. Similarly, second roller rotational assembly 146 is constructed as first roller rotational assembly 144 wherein roller bearings (not shown) are positioned between second frame member 98 and second support member 88 and second support member 88 is connected to second rotatable drive shaft (not shown) for rotating second support member 88 about fourth axis of rotation 100, wherein relative positions of second axis of rotation 90 with respect to fourth axis of rotation 100 can be seen in FIG. 6. Second motor 148, as seen in FIGS. 3 and 5, is connected to second rotatable drive shaft (not shown) such that rotating second support member 88 rotates second axis of rotation 90 about fourth axis of rotation 100. As a result, both first and second rollers 80, 86 rotate about their respective first axis of rotation 84 and second axis of rotation 90 and the first and second axis of rotation 84 and 90 can be rotated about respective third axis of rotation 94 and fourth axis of rotation 100.

As will be further discussed herein, translational movement is also imparted to first and second axis of rotation 84, 90 along third and fourth axis of rotation 94, 100 respectively at the same time first and second axis of rotation 84, 90 are rotated about third and fourth axis of rotation 94, 100 respectively. This movement of first and second rollers 80, 86 maintains first and second rollers 80, 86 in contact with one another and in contact with support 108. Translational movement of first axis of rotation 84 along third axis of rotation 94 is accomplished with respect to first roller rotational assembly 144 with first frame 150 connected to first support member 82 such that with movement of first frame 150 first support member 82 and first axis of rotation 84 move along third axis of rotation 94. First frame 150 can be connected to first support member 82 in various ways. In this example, first frame 150 in FIG. 7 is connected to first frame member 92 and first frame member 92 is secured to drive gear and transmission assembly 142 of first motor 140. First rotatable drive shaft 138 is connected to drive gear and transmission assembly 142 and is also secured to first support member 82. In this configuration, first frame 150 is connected to first support member 82. With first frame 150 moving in a direction along third axis of rotation 94 in this example, first frame member 92, drive gear and transmission assembly 142, first rotatable drive shaft 138, first motor 140, first support member 82 and first axis of rotation 84 of first roller 80 move along third axis of rotation 94.

First frame 150 imparts translational movement to first support member 82 along third axis of rotation 94 with first frame 150 secured to first ball nut 152 and first threaded shaft 154 is connected to first ball nut 152, as seen in FIG. 7. First threaded shaft 154 is connected to first drive gear and transmission assembly 156 and drive gear and transmission assembly 156 is connected to first rotation drive motor 158. With first rotation drive motor 158 activated rotation is imparted to first threaded shaft 154 resulting in first ball nut 152 moving up or down first threaded shaft 154 depending on the direction of rotation of first threaded shaft 154. In turn, movement of first ball nut 152 results in first frame 150 moving along third axis of rotation 94. First rotation drive motor 158 in this example is a step motor. Movement imparted to first ball nut 152 as a result causes first frame 150 and in turn first support member 82 and first axis of rotation 84 to move in a linear direction along third axis of rotation 94.

Movement of second axis of rotation 90 along fourth axis of rotation 100 is similarly accomplished for second roller 86 associated with second roller rotational assembly 146 as described above with respect to first axis of rotation 84 being moved along third axis of rotation 94 associated with first roller rotational assembly 144 and shown in FIG. 7. Second frame (not shown), similarly configured as first frame 150, as shown in FIG. 7, is connected to second support member 98 as first frame 150 is connected to first support member 82 as described above such that with movement of second frame (not shown) second frame member 98 and the second axis of rotation 90 move along fourth axis of rotation 100 as were first support member 82 and first axis of rotation 84 moved along third axis of rotation 94.

As similarly shown in FIG. 7 for first frame 150, second frame 151, as seen in FIG. 5, is similarly connected to second frame member 98 and second frame 151 is secured to second drive gear and transmission assembly 153 of second rotation drive motor 155. Second rotatable drive shaft (not shown) is connected to second drive gear and transmission assembly 153 and is also secured to second support member 88. With second frame member 98 moving in a direction along fourth axis of rotation 100, second frame member 98, second drive gear and transmission assembly 153, second rotatable shaft (not shown), second rotation drive motor 155, second support member 88 and second axis of rotation 90 of second roller 86 move along fourth axis of rotation 100. Second frame 151 imparts translational movement to second support member 88 along fourth axis of rotation 100 with second frame 151 secured to second ball nut 157 and second ball nut is connected to second threaded shaft 159 as is similarly configured as seen in FIG. 7 with respect to corresponding parts discussed above with respect to first roller 80 and first axis of rotation 84. With second threaded shaft 159 connected to second drive gear and transmission assembly 153 and second drive gear and transmission assembly 153 connected to second rotation drive motor 155, rotation of second threaded shaft 159 by second rotation drive motor 155 results in second ball nut 157 moving up or down second threaded shaft 159 depending on the direction of rotation of second threaded shaft 159. In turn, movement of second ball nut 157 results in second frame 151 moving along fourth axis of rotation 100. Second rotation drive motor 155 in this example is a step motor. Movement imparted to second ball nut 157 causes second frame 151 and in turn second support member 88 and second axis of rotation 90 to move along fourth axis of rotation 100.

First and second axis of rotations 84, 90 both are moveable along third and fourth axis of rotation 94, 100 respectively in similar fashion. Both first and second axis of rotation 84, 90 in this example operate in the same fashion as described in the operation of moving first axis of rotation 84 along third axis of rotation 94 as described above and shown in FIG. 7.

With first roller 80, first axis of rotation 84 and first support member 82 and with second roller 86, second axis of rotation 90 and second support member 88 in a first position as seen in FIG. 6, first and second rollers 80, 86 are in contact with one another at a first elevation E with respect to support 108 and first and second rollers 80, 86 are in contact with support 108 spaced apart at first distance D along support 108. Gap filler member 64 is in contact with first and second rollers 80, 86 and with support 108. As gap filler member 64 is pulled through an aperture bounded by first and second rollers 80 and 86 and support 108, first and second rollers 80, 86 rotate about first axis of rotation 84 and second axis of rotation 90 respectively with first and second rollers 80, 86 forming as seen in FIG. 4 adjacent curved sides 70, 72 which each have radius of curvature 76 and gap filler member 64 results in being in size S.

Figure 8:
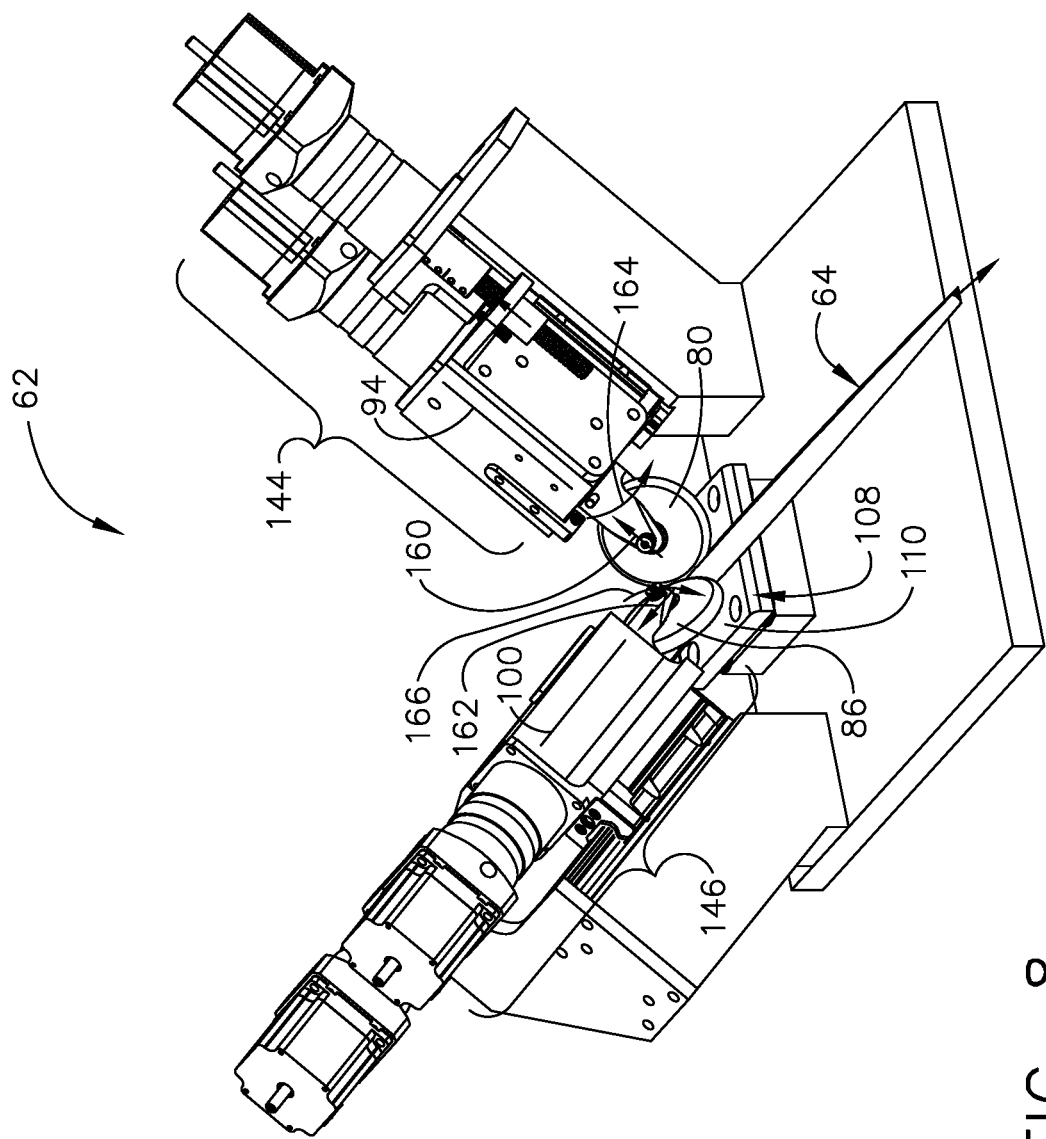
FIG. 8 is a perspective view of the roller assembly of FIG. 3 wherein the axis of rotation of each of the rollers have been rotated in opposite directions about an axis of rotation of a support member of each of the rollers and each of the axis of rotation of each of the rollers have also been moved along the axis of rotation of the support for each roller.
Figure 9:
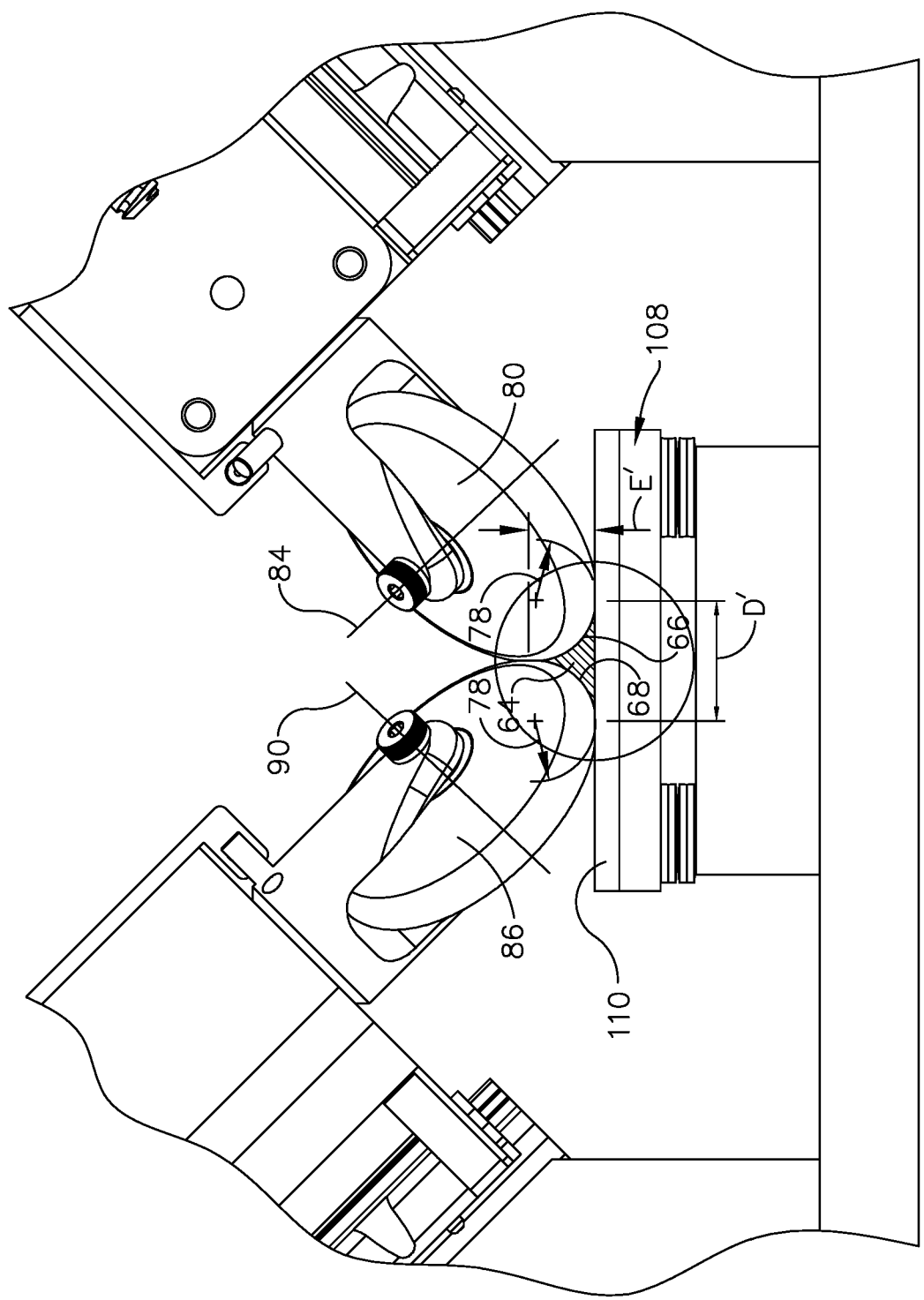
FIG. 9 is an enlarged partial front plan view of the roller assembly of FIG. 8 with the gap filler in cross section passing through the rollers with the rollers rotated and moved as shown in FIG. 8 to form a different radius and size for gap filler than shown in FIG. 6.
Figure 10:
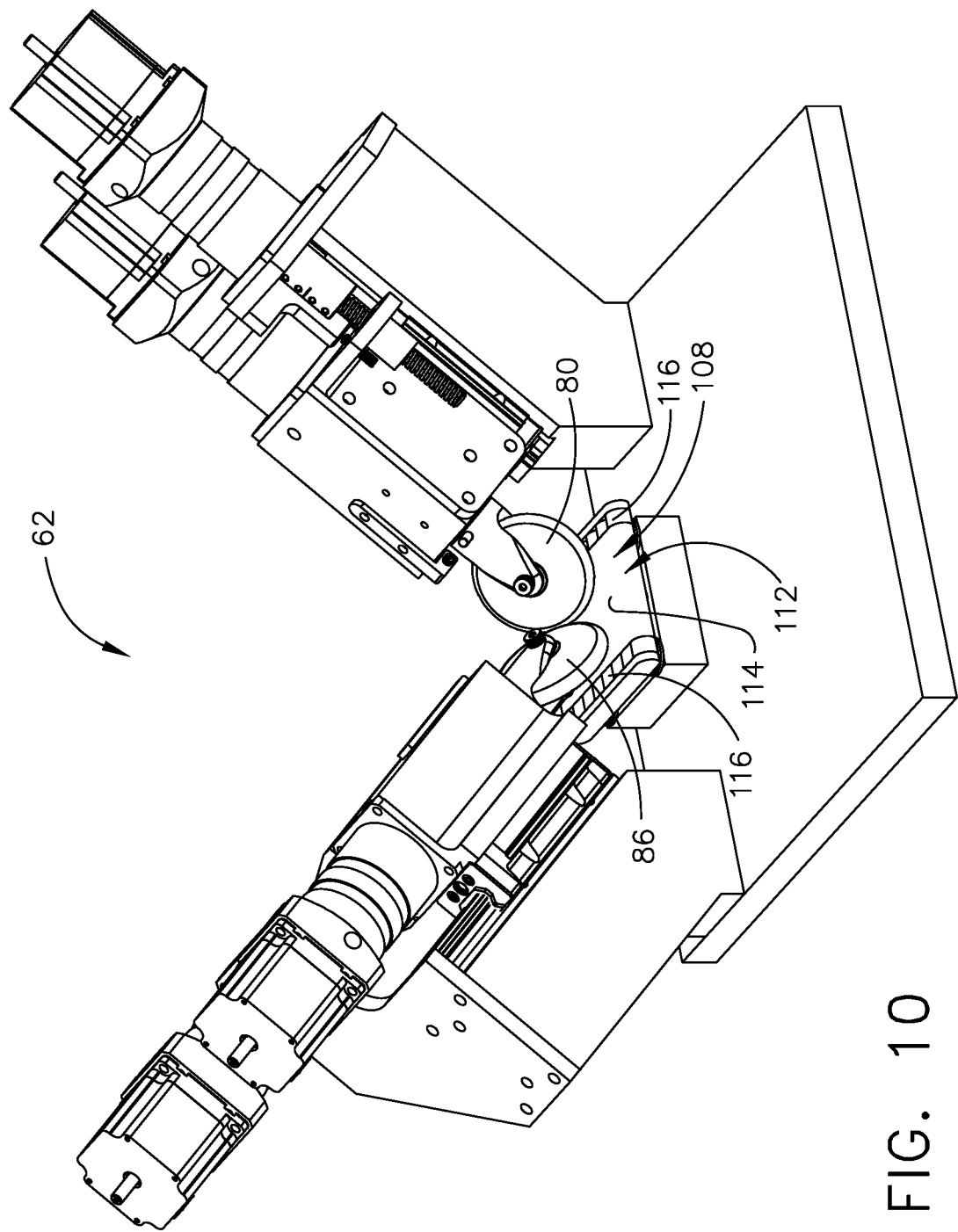
FIG. 10 is a perspective view of the roller assembly of FIG. 3, without a gap filler passing through the rollers along with a second embodiment of the support for the gap filler.

With first roller 80, first axis of rotation 84 and the first support member 82 and with second roller 86, second axis of rotation 90 and second support member 88 moved into a second position as seen in FIG. 9, first support member 82 with first axis of rotation 84 and second support member 88 with second axis of rotation 90 have been each moved along third and fourth axis of rotation 94, 100 respectively. In this example, first axis and second axis of rotation 84, 90 have been moved in directions 160 and 162 along third axis and fourth axis of rotation 94, 100 respectively as seen in FIG. 8. Also as this is occurring, first support member 82 with first axis of rotation 84 and second support member 88 with second axis of rotation 90 have been each rotated in opposite rotational directions 164, 166 respectively as seen in FIG. 8 about third axis and fourth axis of rotation 94, 100 respectively.

With translation and rotation of first axis of rotation 84 and second axis of rotation 90 together, first and second rollers 80, 86 maintain in contact with one another in moving from the first position as seen in FIG. 6 at first elevation E with respect to support 108 to the second position as seen in FIG. 9 at second elevation E' as seen in FIG. 9. First and second rollers 80, 86 also remain in contact with support 108 as seen in FIG. 6 in moving first and second rollers 80, 86 to the second position as seen in FIG. 9. Gap filler member 64 is in contact with first and second rollers 80, 86 and with support 108.

As gap filler member 64 is pulled through first and second rollers 80, 86 and first and second rollers 80, 86 changes from first position as seen in FIG. 6 to second position as seen in FIG. 9, first and second rollers 80, 86 continue to rotate about first and second axis of rotation 84, 90 respectively as gap filler member 64 passes through first and second rollers 80, 86 forming adjacent curved sides 70, 72 from first radius of curvature 76 to second radius of curvature 78. In addition, gap filler member 64 increases in size from size S to size S' as seen in FIG. 4 as gap filler 64 extends in a direction along length L' of gap filler 64 from first end 74 toward second end 75. The continuous and simultaneous movement of rotation and translation of first and second axis of rotation 84, 90, and the continued rotation of the first and second rollers 80, 86 as gap filler member 64 is pulled through first and second rollers 80, 86, allows first and second rollers 80, 86 to impart smooth transition with respect to size and radius of curvature of gap filler member 64, as first and second rollers 80, 86 move from first position of FIG. 6 to second position as seen in FIG. 9 without imparting abrupt surface changes to gap filler member 64 in doing so.

This rotational and translational movement of first and second axis of rotation 84, 90 can be reversed by reversing the direction of rotational directions 164, 166 of rotation of first and second axis of 84, 90 and at the same time reversing the directions 160 and 162 of translational movement of first and second axis of rotation 84, 90 along third and fourth axis of rotation 94, 100 respectively. Reversing of rotational directions 164, 166 and directions 160, 162 of translational movement of first and second axis of rotation 84, 90 results in reducing size S' of gap filler 64 in FIG. 9 to size S as seen in FIG. 6 and also reducing the radius of curvature from radius of curvature 78 of adjacent curved sides 70, 72 as seen in FIG. 9 to radius of curvature 76 of adjacent curved sides 70, 72 as seen in FIG. 6. This is also seen in gap filler member 64 in FIG. 4 as gap filler member 64 extends along length L' from a central portion of gap filler member 64 toward second end 75.

As mentioned above, the continuous and simultaneous movement of rotation and translation of first and second axis of rotation 84, 90, and the continued rotation of the first and second rollers 80, 86 about first and second axis of rotation 84, 90 respectively as gap filler member 64 is pulled through first and second rollers 80, 86 allows first and second rollers 80, 86 to impart smooth transition to the surfaces of gap filler member 64 with imparting change to size and radius of curvature of gap filler member 64.

Roller assembly 62 having first and second rollers 80, 86 move from first position of FIG. 6 to second position of FIG. 9 and to move from second position of FIG. 9 to first position of FIG. 6, imparts a smooth transition to surfaces of gap filler member 64 with changing of size and radius of curvature of adjacent sides of gap filler member 64 without imparting abrupt surface changes to gap filler member 64 in doing so.

In referring to the flow chart of FIG. 11, method 168 is provided of forming adjacent curved sides 70, 72 in a composite gap filler member 64 which includes step 170 of positioning first roller 80 against composite material for gap filler member 64 with first roller 80 supported by first support member 82. First roller 80 rotates relative to first support member 82 about first axis of rotation 84. First support member 82 is rotatable about third axis of rotation 94 which extends in direction 96 transverse to first axis of rotation 84. Method 168 further includes step 172 of positioning second roller 86 against composite material for gap filler member 64 with second roller 86 supported by second support member 88. Second roller 86 rotates relative to second support member 88 about second axis of rotation 90. Second support member 88 is rotatable about fourth axis of rotation 100 which extends in direction 102 transverse to second axis of rotation 90. Method 168 further includes step 174 of pulling the composite material of gap filler member 64 past first and second rollers 80, 86 wherein first roller 80 rotates about first axis of rotation 84 and second roller 86 rotates about second axis of rotation 90. Pulling of the composite material for gap filler member 64 can be done by a number of ways conventionally known in the art which applies tension to the composite material being pulled past first and second rollers 80, 86. In addition, method 168 includes step 176 of rotating first axis of rotation 84 about third axis of rotation 94 and rotating second axis of rotation 90 about fourth axis of rotation 100 as discussed earlier.

Method 168 further includes a step of positioning first roller 80 and second roller 86 into contact with one another and a step of positioning the first and second rollers 80, 86 into contact with support 108. In addition, method 168 includes a step of moving first axis of rotation 84 along third axis of rotation 94 and moving second axis of rotation along fourth axis of rotation 100 as also previously discussed. The moving of first axis of rotation 84 and second axis of rotation 94 along third and fourth axis of rotation 94, 100 respectively allows first and second rollers 80, 86 to not interfere with rotational movement of first and second rollers 80, 86 about third and fourth axis of rotation 94, 100 respectively with first and second axis of rotation 84, 90 being rotated about third and fourth axis of rotation 94, 100 respectively. With this rotational movement of first and second axis of rotation 84, 90 about third and fourth axis of rotation 94, 100 respectively along with translational movement of first and second axis of rotation 84, 90 along third and fourth axis of rotation 94, 100 respectively, this maintains first and second rollers 80, 86 in contact with one another and maintains first and second rollers 80, 86 in contact with support 108. As a result, smooth transitions occur with respect to changes of radius of curvature for adjacent curved sides 70, 72 as well as with the change in size of gap filler member 64 with first and second rollers 80, 86 in contact with composite material for gap filler member 64.

Figure 12:
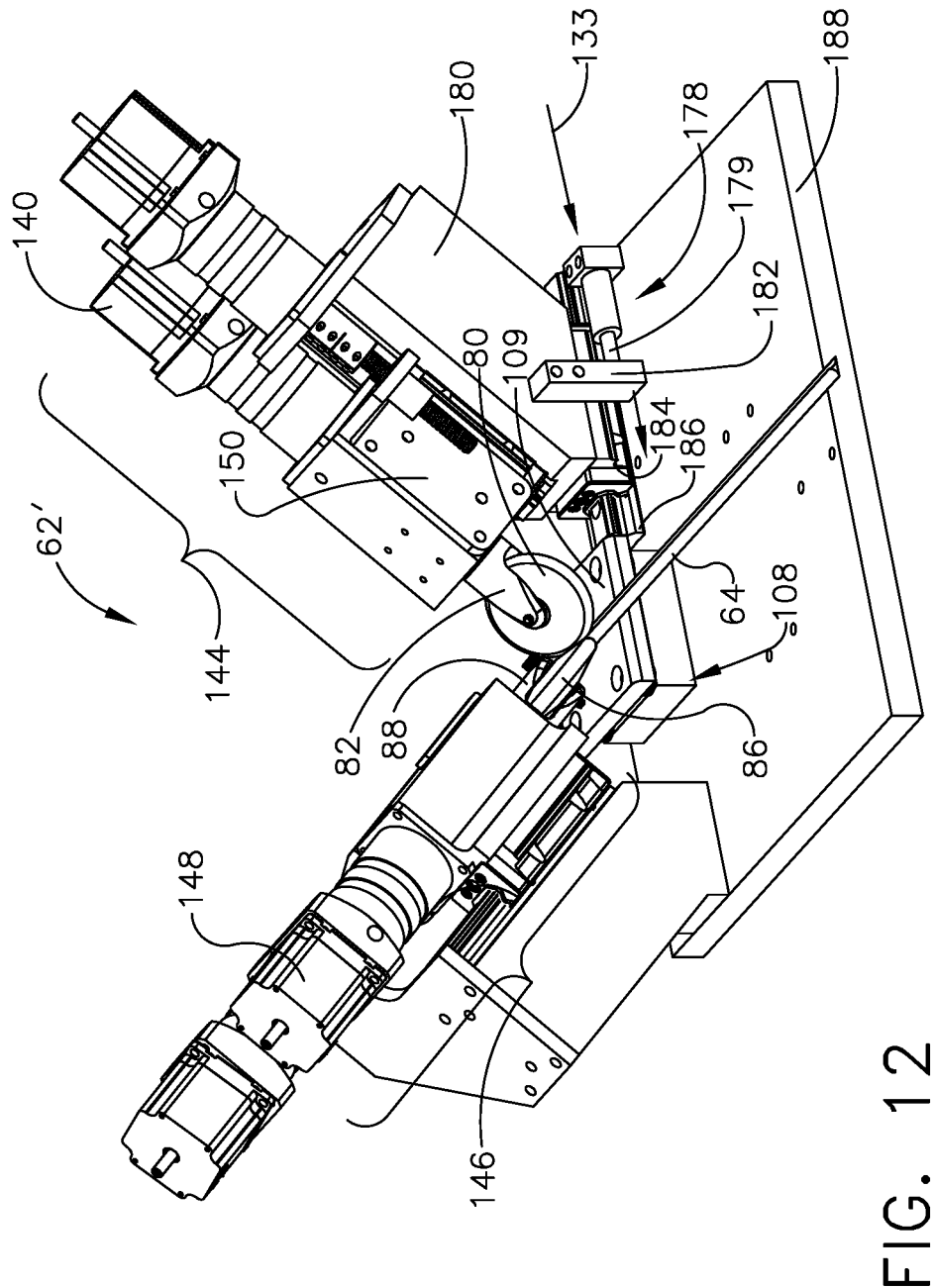
FIG. 12 is a perspective view of a second embodiment of the roller assembly of FIG. 3 imparting a curved surface to adjacent sides of a gap filler.

In referring to FIG. 12, a second embodiment of roller assembly 62' is shown. Second embodiment of roller assembly 62' includes the features of roller assembly 62 as described earlier. For example, first and second rollers 80, 86 impart external surfaces 66 and 68 of gap filler member 64, as seen in FIG. 4, such that external surfaces 66 and 68 smoothly transition in changing radius of curvature of adjacent curved sides 70, 72 in forming symmetric adjacent curved sides 70, 72 of gap filler member 64 along length L' of gap filler member 64, as desired. In addition, roller assembly 62' also provides the features of roller assembly 62 to provide smooth transition in changing size of symmetrically formed gap filler member 64 along length L' as desired, such as also seen for example in FIG. 4.

Figure 16:
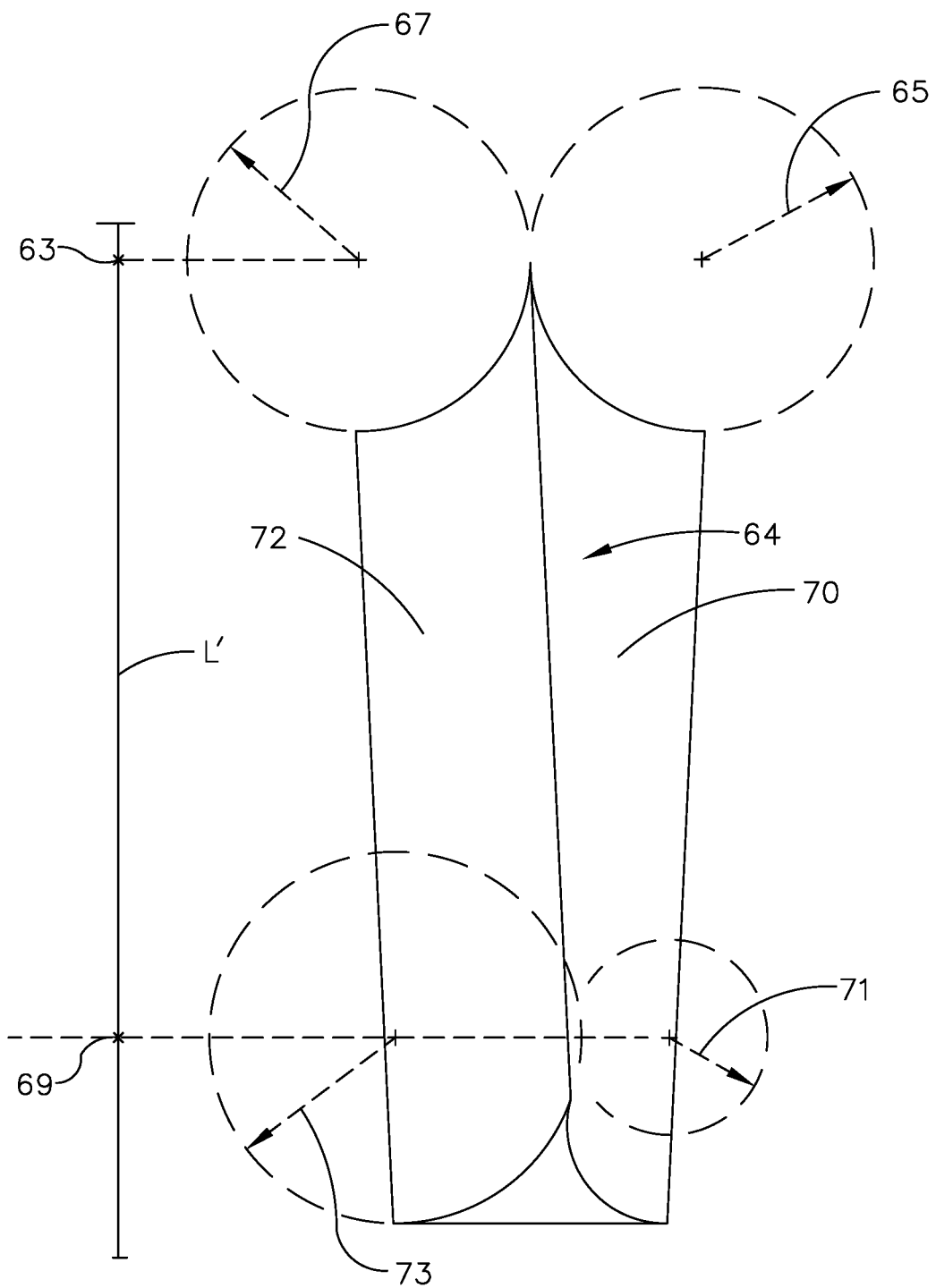
FIG. 16 is a perspective view of an example gap filler formed by the second embodiment of the roller assembly of FIG. 12 wherein the curved adjacent surfaces of the gap filler differ in radius of curvature.

In addition, second embodiment of roller assembly 62', as will be described, can provide smooth transition of adjacent curved sides 70, 72 to each have a different radius of curvature such that composite gap filler member 64 can be asymmetric in configuration along L' of gap filler member 64 as desired, as seen in FIG. 16. In referring to FIG. 16, gap filler member 64 is configured with roller assembly 62' such that roller assembly 62' at location 63, along length L' of gap filler member 64, imparts first gap filler member radius 65 on adjacent curved side 70 which has the same radius dimension as second gap filler member radius 67 on adjacent curved side 72 and as gap filler member 64 progresses along length L' of gap filler member 64 to location 69, third gap filler member radius 71 on adjacent curved side 70 has a different radius dimension as fourth gap filler member radius 73 on adjacent curved side 72. Second embodiment of roller assembly 62', as will be discussed, can smoothly transition to form gap filler member 64 to have an asymmetric configuration of adjacent curved sides 70, 72 along length L'.

Figure 14:
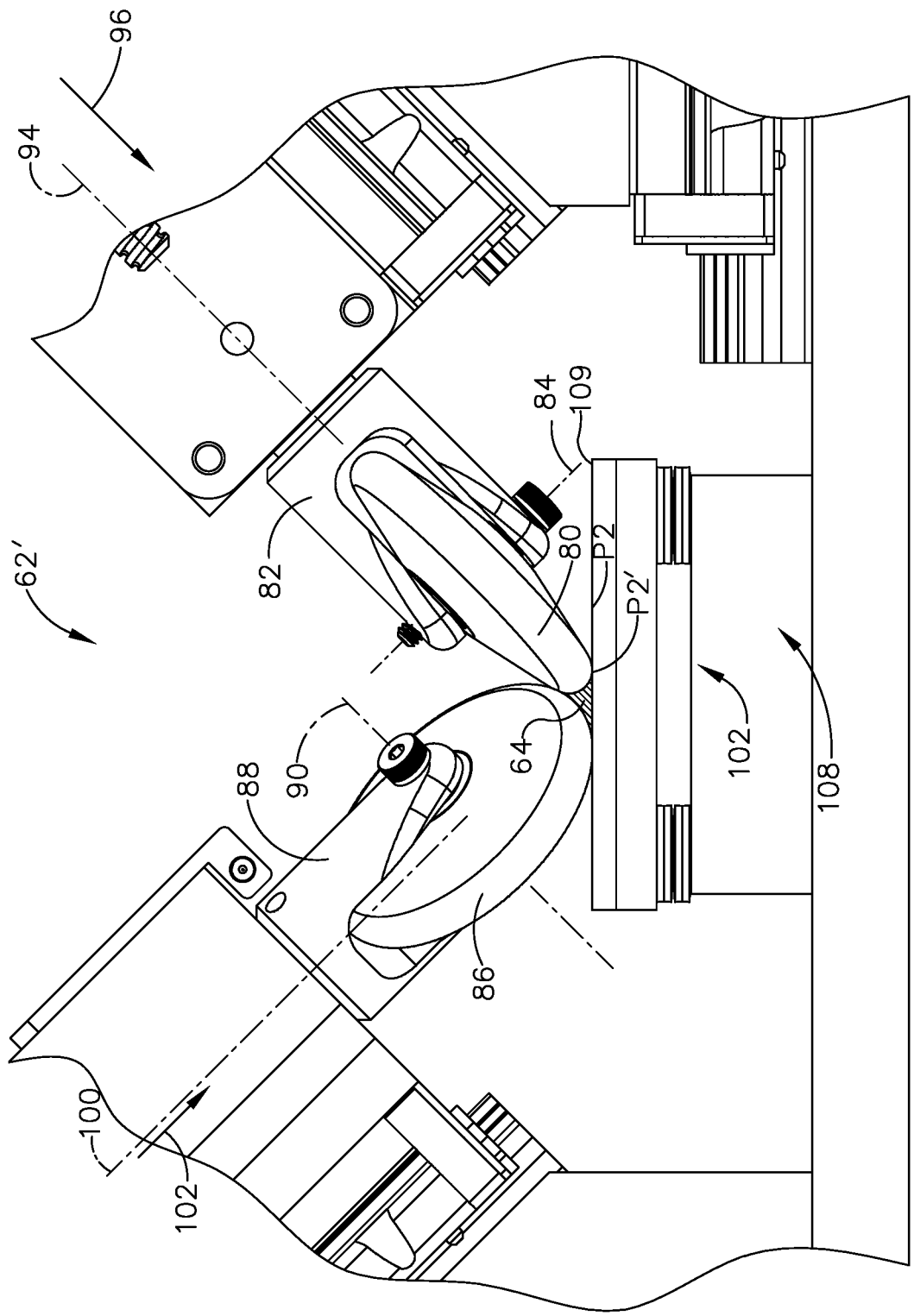
FIG. 14 is a partial front plan view of the second embodiment of roller assembly of FIG. 12 with gap filler in cross section passing through the rollers wherein the rollers are positioned forming adjacent curved surfaces of the gap filler to each have a different radius of curvature.

Second embodiment of roller assembly 62', as seen in FIGS. 12 and 14, for forming adjacent curved sides 70, 72, as seen in FIG. 16, in composite gap filler member 64, includes first roller 80 supported by first support member 82 wherein first roller 80 rotates relative to first support member 82, in this example, about first axis of rotation 84, as seen in FIG. 14. Second roller 86 is supported by second support member 88 wherein second roller 86 rotates relative to second support member 88, in this example, about second axis of rotation 90. First support member 82 is rotatable about third axis of rotation 94 and third axis of rotation 94, in this example, extends in a direction 96 transverse to first axis of rotation 84. Second support member 88 is rotatable about fourth axis of rotation 100 and fourth axis of rotation 100, in this example, extends in direction 102 transverse to second axis of rotation 90.

Second embodiment of roller assembly 62' further includes support 108 which includes surface 109. Surface 109 is associated with first and second rollers 80, 86 with first roller 80 and second roller 86 in contact at location P1, as seen for example, in FIG. 13, with one another and first roller 80 in contact at location P2 with surface 109 and second roller 86 in contact at location P3 with surface 109.

Figure 13:
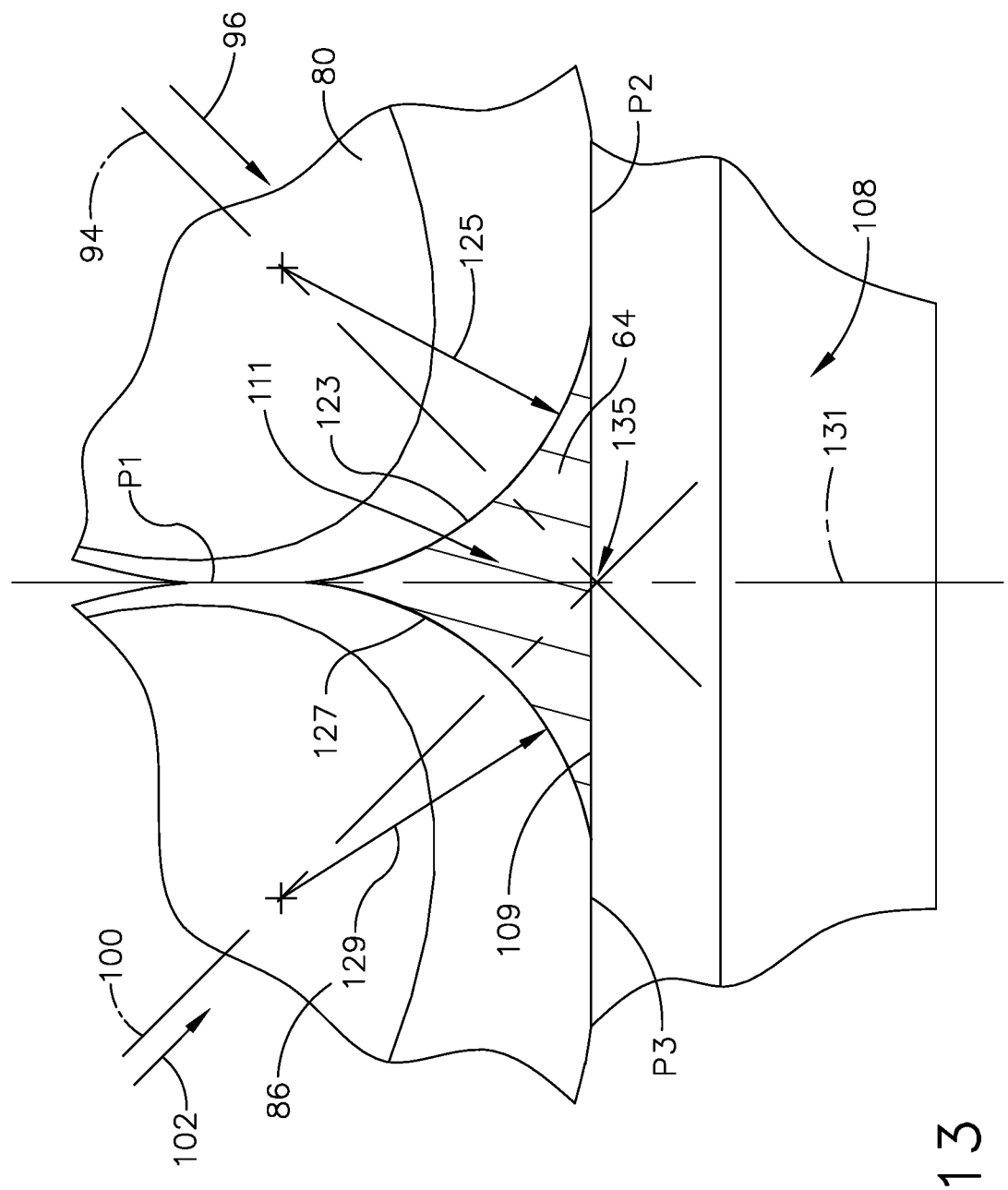
FIG. 13 is an enlarged partial front plan view of the second embodiment of roller assembly of FIG. 12 with gap filler in cross section passing through the rollers, wherein the rollers are positioned forming adjacent curved surfaces of the gap filler to each have a same radius of curvature.
Figure 15:
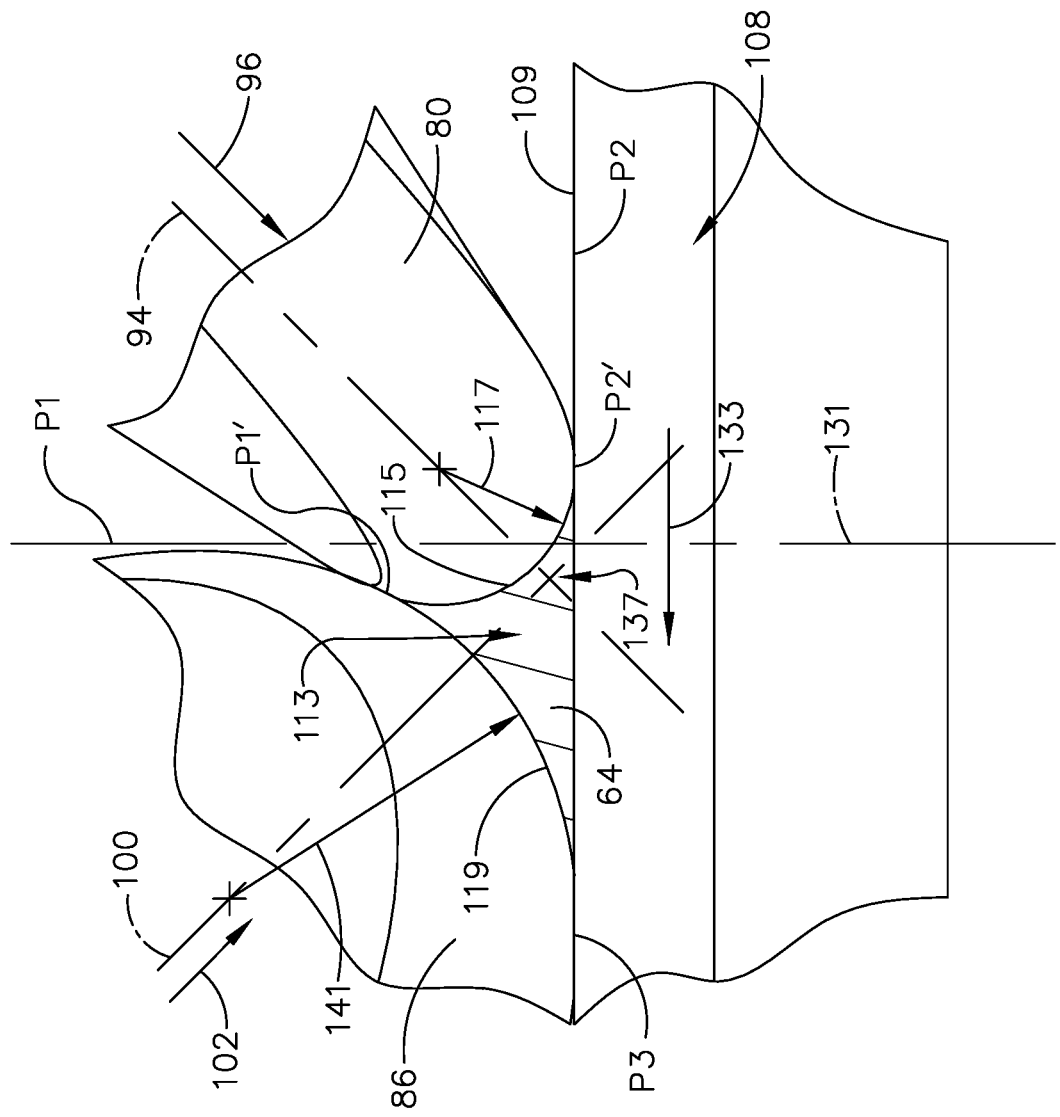
FIG. 15 is an enlarged partial front plan view of the second embodiment of the roller assembly of FIG. 14 with gap filler in cross section passing through the rollers.

With rotation of first roller 80 about third axis of rotation 94 from position of first roller 80, as seen in FIG. 13, to a position of first roller 80 as shown in FIGS. 14 and 15, with at least one of the first roller 80 or second roller 86 moved relative to the other such that first roller 80 maintains contact with second roller 86 and first roller and second roller maintain contact with surface 109, first roller 80, second roller 86 and surface 109 form aperture 113 as seen in FIG. 15.

In this example, first roller 80, which was positioned in contact with surface 109 at location P2 in FIG. 13, has been moved along surface 109 closer to second roller 86 to location P2', as seen in FIGS. 14 and 15, such that with first roller 80 rotating about third axis of rotation 94 first roller 80 maintains contact with second roller 86. This contact between first roller 80 and second roller 86 is seen with first roller 80 in FIG. 13 in contact with second roller 86 at location P1 relative to surface 109 prior to rotation of first roller 80 and remains in contact with second roller 86 as first roller rotates about third axis of rotation 94 as seen in FIG. 15 with first roller 80 being in contact with second roller 86 at location P1' relative to surface 109 of support 108. In this example, as first roller 80 is rotated about third axis of rotation 94 and first roller 80 is at the same time moved along surface 109 toward second roller 86, first and second rollers 80, 86 stay in contact with one another changing in position of contact from location P1 to location P1' and first roller 80 remains in contact with surface 109 changing in position from P2 to P2'. In this example, second roller 86 which is not moved along surface 109 and is not rotated relative to fourth axis of rotation 100 remains in contact with surface 109 at position P3.

Aperture 113, as seen in FIG. 15, includes first roller 80 which defines first curved side 115 having first radius 117 and second roller 86 defines second curved side 119, adjacent to first curved side 115, having second radius 141 such that first radius 117 and second radius 141 are unequal. As a result of this configuration of aperture 113, first curved side 115 having first radius 117 corresponds to imparting to gap filler 64 member curved side 70 having third gap filler member radius 71 as seen in FIG. 16 and second curved side 119 having second radius 141 corresponds to imparting to gap filler member 64 curved side 72 having fourth gap filler member radius 73, as seen in FIG. 16.

With first roller 80 and second roller 86 in contact with one another and in contact with surface 109 as seen in FIG. 13, a second aperture 111 is defined. In this example, the shape of second aperture 111 includes first roller 80 defining first curved side 123 having a first radius 125 and second roller 86 defining second curved side 127, having second radius 129, adjacent to first curved side 123, wherein first radius 125 equals second radius 129. As a result of this example of configuration of second aperture 111, first curved side 123 having first radius 125 corresponds to imparting to gap filler member 64 curved side 70 having first gap filler member radius 65 and second curved side 127 having second radius 129 corresponds to imparting to gap filler member 64 second curved side 72 having second gap filler member radius 67, as seen in FIG. 16. As a result, gap filler member 64, which is pulled through second aperture 111, results in curved side 70 and curved side 72 of gap filler member 64 being symmetric.

A smooth transformation in changing between of configurations of aperture 113 and second aperture 111 can be easily accomplished with roller assembly 62' which imparts a smooth transition in forming the shape of gap filler 64 as gap filler member 64 passes through a configured aperture. For example, in changing between a symmetric configured aperture such as second aperture 111 to an asymmetric configured aperture 113, this can be accomplished with a minimum of movement of one roller being rotated about either the third or fourth axis of rotation 94, 100 and at least one of one roller or the other roller being moved relative to the other such that the rollers maintain contact with one another as the one roller rotates about either the third or fourth axis of rotation 94, 100 and the rollers maintain contact with surface 109 of support 108. This smooth transition results in providing corresponding smooth transition to adjacent curved walls 70, 72 along length L' of gap filler 64. The smooth transformation in changing shape of aperture through which composite gap filler member 64 passes resulting in smooth transition of adjacent curved walls 70, 72 along length L' of gap filler member 64 can also, for example, be accomplished with both rollers being rotated about third and fourth axes of rotation 94, 100 and at least one of one roller or the other roller being moved relative to the other roller such that the rollers maintain contact with one another as each roller rotates about one of the third and fourth axis of rotation 94, 100 and as each roller maintains contact with surface 109 of support 108. As a result, gap filler member 64 maintains smooth transition with respect to changing and forming adjacent curved sides 70, 72, such as in this example of transitioning from symmetric gap filler member 64 configuration to having different radius of curvature and forming an asymmetric gap filler member 64 configuration. This transitioning from a symmetric configuration for gap filler member 64 to an asymmetric configuration for gap filler member 64 can be applied with transitioning from an asymmetric configuration for gap filler member 64 to a symmetric configuration for gap filler member 64 with similar movements of the rollers.

In referring to FIG. 13, second aperture 111 includes plane of symmetry 131 which is co-planar to a plane of symmetry of gap filler member 64 that would be formed by second aperture 111. As mentioned earlier, at least one of first roller 80 or second roller 86 is moved relative to the other. In referring to FIG. 15, at least one of first roller 80 or second roller 86 is moved in direction 133 transverse with respect to plane of symmetry 131 and in this example first roller 80 is moved toward second roller 86 in direction 133 transverse with respect to plane of symmetry 131. This movement, as mentioned earlier, maintains first roller 80 in contact with surface 109 and maintains first roller 80 and second roller 86 in contact with one another as first roller 80 is rotated about, in this example, third axis of rotation 94.

In further referring to FIG. 13, third axis of rotation 94 extends in direction 96 and fourth axis of rotation 100 extends in direction 102. With respect to this example of second aperture 111, third and fourth axis of rotation 94, 100 intersect at first location 135 along plane of symmetry 131 of second aperture 111. With rotation of first roller 80, as seen with respect to FIGS. 13 and 15, and movement of first roller 80, in this example, in direction 133 transverse with respect to plane of symmetry 13, as seen in FIGS. 13 and 15, aperture 113, as seen in FIG. 15, is formed and third and fourth axes of rotation 94, 100 intersect at second location 137 spaced apart from plane of symmetry 131 which had been defined by second aperture 111.

As mentioned earlier, with rotation, in this example, of first roller 80 about third axis of rotation 94 and with at least one of first roller 80 or second roller 86 being moved relative to the other such that the first roller 80 maintains contact with second roller 86 and first roller 80 and second roller 86 maintain contact with surface 109, first roller 80, second roller 86 and surface 109 form aperture 113, as seen in FIG. 15. In this example, the movement of the rollers relative to the other is movement of first roller 80 toward second roller 86 in direction 133 transverse to plane of symmetry 131, as earlier mentioned. Imparting movement of first roller 80, in this example, is accomplished, as seen in FIG. 12, with drive mechanism 178 which imparts linear movement to shaft 179. Shaft 179 is secured to first support structure 180, which provides support to first support member 82 and first roller 80, with bracket 182. Drive mechanism 178 includes a power source of one of a pneumatic cylinder, hydraulic cylinder or a servo motor associated with the shaft 179 such that shaft 179 can extend or contract in a linear direction. First support structure 180 includes rail guide 184 which engages rail 186. Rail 186 extends in direction 133 transverse to plane of symmetry 131, as seen in FIGS. 12 and 15, which guides travel of first support member 82 in direction 133. Platform 188, in this example as seen in FIG. 12, provides support to rail 186 and support 108.

As described earlier with respect to FIG. 6, with respect to an example of roller assembly 62, the same features apply in the example with respect to second embodiment of roller assembly 62'. First support member 82 includes first portion 118 and second portion 120 wherein first portion 118 of first support member 82 extends along first side 121 of first roller 80 and second portion 120 of first support member 82 extends along second side 122 of first roller 80. First axle member 124 includes a bolt member which extends along first axis of rotation 84 of first roller 80 and is supported by first portion 118 of first support member 82, extends through first roller 80 and extends to and is supported by second portion 120 of first support member 82. Second support member 88 includes first portion 126 and second portion 128 wherein first portion 126 of second support member 88 extends along first side 130 of second roller 86 and second portion 128 of second support member 88 extends along second side 132 of second roller 86. Second axle member 134, which in this example includes a bolt member, extends along second axis of rotation 90 of second roller 86 and is supported by the first portion 126 of second support member 88, extends through second roller 86 and extends to and is supported by second portion 128 of second support member 88.

Similarly second embodiment of roller assembly 62' includes the features as shown and described earlier with respect to FIGS. 7 and 8 for roller assembly 62. Second embodiment of roller assembly 62' includes roller bearings 136 being positioned between first frame member 92 and first support member 82 permitting ease in rotation of first support member 82 about third axis of rotation 94 and relative to first frame 150. First support member 82 is connected to first rotatable drive shaft 138 for rotating first support member 82 about third axis of rotation 94. First motor 140, such as a step motor in this example, is connected to first rotatable drive shaft 138 through drive gears and transmission assembly 142 such that rotating first support member 82 rotates first axis of rotation 84 about third axis of rotation 94. The position of first axis of rotation 84 with respect to third axis of rotation 94 is seen in FIGS. 6 and 14. This construction of first roller rotational assembly 144 associated with first roller 80 is similar to that of the construction of second roller rotational assembly 146 associated with second roller 86 positioned across from first roller rotational assembly 144 with respect to support 108, as seen in FIGS. 3, 5 and 12 for each of roller assembly 62 and second embodiment of roller assembly 62'. Similarly, second roller rotational assembly 146 is constructed as first roller rotational assembly 144 wherein roller bearings (not shown) are positioned between second frame member 98 and second support member 88 and second support member 88 is connected to second rotatable drive shaft (not shown) for rotating second support member 88 about fourth axis of rotation 100, wherein relative positions of second axis of rotation 90 with respect to fourth axis of rotation 100 can be seen in FIGS. 6 and 14. Second motor 148, as seen in FIGS. 3 and 5, is connected to second rotatable drive shaft (not shown) such that rotating second support member 88 rotates second axis of rotation 90 about fourth axis of rotation 100. As a result, both first and second rollers 80, 86 rotate about their respective first axis of rotation 84 and second axis of rotation 90 and the first and second axis of rotation 84 and 90 can be rotated about respective third axis of rotation 94 and fourth axis of rotation 100.

Second embodiment of roller assembly 62' also has first support member 82 movable along third axis of rotation 94 and second support member 88 movable along fourth axis of rotation 100 as was also provided and discussed earlier with respect to roller assembly 62. Translational movement is imparted to first and second axis of rotation 84, 90 along third and fourth axis of rotation 94, 100 respectively at the same time first and second axis of rotation 84, 90 are rotated about third and fourth axis of rotation 94, 100 respectively. This movement of first and second rollers 80, 86 maintains first and second rollers 80, 86 in contact with one another and in contact with support 108. Translational movement of first axis of rotation 84 along third axis of rotation 94 is accomplished with respect to first roller rotational assembly 144 with first frame 150 connected to first support member 82 such that with movement of first frame 150 first support member 82 and first axis of rotation 84 move along third axis of rotation 94. First frame 150, as described earlier, can be connected to first support member 82 in various ways. In this example, first frame 150 in FIG. 7 is connected to first frame member 92 and first frame member 92 is secured to drive gear and transmission assembly 142 of first motor 140. First rotatable drive shaft 138 is connected to drive gear and transmission assembly 142 and is also secured to first support member 82. In this configuration, first frame 150 is connected to first support member 82. With first frame 150 moving in a direction along third axis of rotation 94 in this example, first frame member 92, drive gear and transmission assembly 142, first rotatable drive shaft 138, first motor 140, first support member 82 and first axis of rotation 84 of first roller 80 move along third axis of rotation 94.

First frame 150, for second embodiment of roller assembly 62', as described earlier with respect to roller assembly 62, imparts translational movement to first support member 82 along third axis of rotation 94 with first frame 150 secured to first ball nut 152 and first threaded shaft 154 is connected to first ball nut 152, as seen in FIG. 7 with respect to roller assembly 62. First threaded shaft 154 is connected to first drive gear and transmission assembly 156 and drive gear and transmission assembly 156 is connected to first rotation drive motor 158. With first rotation drive motor 158 activated rotation is imparted to first threaded shaft 154 resulting in first ball nut 152 moving up or down first threaded shaft 154 depending on the direction of rotation of first threaded shaft 154. In turn, movement of first ball nut 152 results in first frame 150 moving along third axis of rotation 94. First rotation drive motor 158 in this example is a step motor. Movement imparted to first ball nut 152 as a result causes first frame 150 and in turn first support member 82 and first axis of rotation 84 to move in a linear direction along third axis of rotation 94.

As was previously discussed with respect to roller assembly 62, second embodiment of roller assembly 62' also includes movement of second axis of rotation 90 along fourth axis of rotation 100 which is similarly accomplished for second roller 86 associated with second roller rotational assembly 146 as described above with respect to first axis of rotation 84 being moved along third axis of rotation 94 associated with first roller rotational assembly 144 and shown in FIG. 7. Second frame (not shown), similarly configured as first frame 150, as shown in FIG. 7, is connected to second support member 98 as first frame 150 is connected to first support member 82 as described above such that with movement of second frame (not shown) second frame member 98 and the second axis of rotation 90 move along fourth axis of rotation 100 as were first support member 82 and first axis of rotation 84 moved along third axis of rotation 94.

Figure 17:
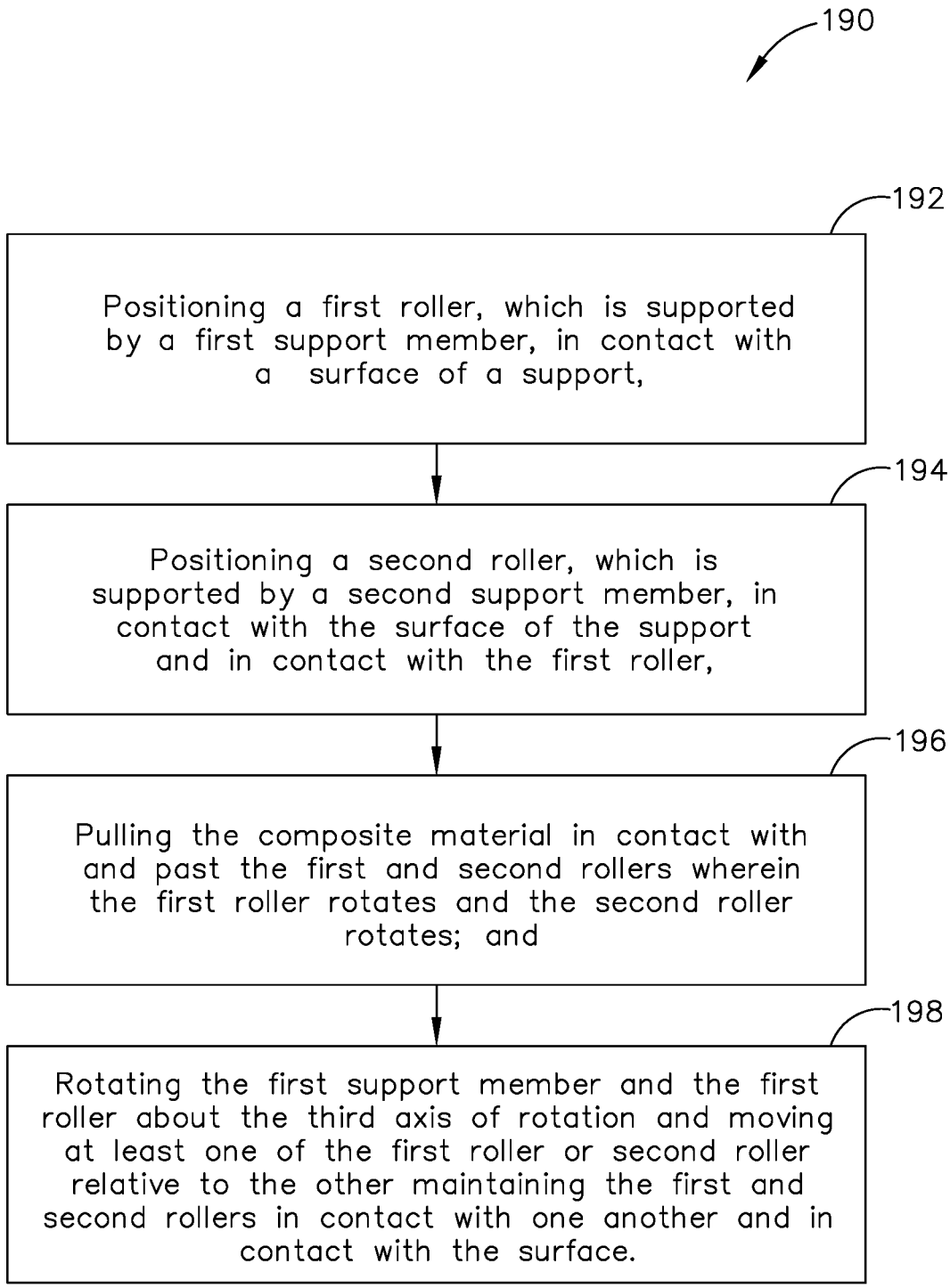
FIG. 17 is a flow chart of a method of forming adjacent curved surfaces in a composite gap filler each having different radius of curvature.

In referring to FIG. 17, method 190 of forming adjacent curved sides 70, 72 in composite gap filler member 64 is shown and includes step 192 of positioning first roller 80, which is supported by first support member 82 in contact with surface 109 of support 108. First roller 80 rotates relative to first support member 82 about first axis of rotation 84 and first support member 82 is rotatable about third axis of rotation 94 which extends in a direction transverse to first axis of rotation 84. Step 194 includes positioning second roller 86, which is supported by second support member 88, in contact with surface 109 of support 108 and in contact with first roller 80. Second roller 86 rotates relative to second support member 88 about second axis of rotation 90 and second support member 88 is rotatable about fourth axis of rotation 100 which extends in direction 102 transverse to second axis of rotation 90. First roller 80, second roller 86 and surface 109 of support 108 define second aperture 111 as seen in FIG. 13. Positioning of first roller 80, in this example, includes first roller 80 defining first curved side 123, as seen in FIG. 13, having first radius 125 and positioning second roller 86 includes second roller 86 defining second curved side 127 having second radius 129 in defining second aperture 111 such that first radius 125 equals second radius 129, which in this forms, in this example, a symmetric first and second curved sides 123, 127.

Method 190 further includes step 196 of pulling composite material, as used in constructing gap filler member 64, in contact with and past first and second rollers 80, 86 wherein first roller 80 rotates about first axis of rotation 84 and second roller 86 rotates about second axis of rotation 90 imparting adjacent curved sides 70, 72 in forming gap filler member 64. Method 190 further includes step 198 of rotating first support member and first roller 80 about third axis of rotation 94 and moving at least one of first roller 80 or second roller 86 relative to the other maintaining first and second rollers 80, 86 in contact with one another and in contact with surface 109 of support 108. First roller 80, second roller 86 and surface 109 of support 108 define aperture 113, as seen in FIG. 15. First roller 80 defines first curved side 115 having first radius 117 and second roller 86 defines second curved side 119, adjacent to the first curved side 115, having a second radius 141 such that first radius 117 and second radius 141 are unequal.

While various embodiments have been described above, this disclosure is not intended to be limited thereto. Variations can be made to the disclosed embodiments that are still within the scope of the appended claims.

What is claimed:

1. A roller assembly for forming adjacent curved surfaces in a composite gap filler member, comprising:
    a first roller is supported by a first support member wherein the first roller rotates relative to the first support member about a first axis of rotation;
    a second roller is supported by a second support member wherein the second roller rotates relative to the second support member about a second axis of rotation, wherein:
        the first support member is rotatable about a third axis of rotation, which provides for rotation of the first axis of rotation about the third axis of rotation; and
        the second support member is rotatable about a fourth axis of rotation, which provides for rotation of the second axis of rotation about the fourth axis of rotation; and
    a support comprising a surface, wherein:
        with the first roller and the second roller in contact with one another and in contact with the surface and with rotation of the first roller about the third axis of rotation and with at least one of the first roller or second roller is moved relative to other, such that the first roller maintains contact with the second roller and the first roller and the second roller maintain contact with the surface, the first roller, second roller and the surface form an aperture; and
        the aperture includes the first roller defining a first curved side of the aperture having a first radius and the second roller defines a second curved side of the aperture, adjacent to the first curved side, having a second radius such that the first radius and the second radius are unequal.

2. The roller assembly of claim 1, wherein with the first roller and the second roller in contact with one another and in contact with the surface a second aperture is formed with the first roller defining a first curved side of the second aperture having a first radius and the second roller defines a second curved side of the second aperture adjacent to the first curved side having a second radius with the first radius equal to the second radius.

3. The roller assembly of claim 2, wherein the second aperture includes a plane of symmetry wherein with the at least one of the first roller or the second roller is moved relative to other, the at least one of the first roller or the second roller is moved in a direction transverse with respect to the plane of symmetry.

4. The roller assembly of claim 3, wherein:
    the third axis of rotation extends in a first direction and the fourth axis of rotation extends in a second direction; and
    with respect to the second aperture, the third and fourth axis of rotation intersect at a first location along the plane of symmetry of the second aperture.

5. The roller assembly of claim 4, wherein with respect to the aperture, the third and fourth axes of rotation intersect at a second location spaced apart from the plane of symmetry.

6. The roller assembly of claim 3, further includes:
    a drive mechanism which imparts linear movement to a shaft; and
    the shaft is secured to a first support structure, which provides support to the first support member and the first roller.

7. The roller assembly of claim 6, wherein the drive mechanism comprises one of a pneumatic cylinder, hydraulic cylinder or a servo motor associated with the shaft.

8. The roller assembly of claim 6, further includes a bracket which secures the shaft to the first support structure.

9. The roller assembly of claim 6, wherein the first support structure includes a rail guide which engages a rail.

10. The roller assembly of claim 9, wherein the rail extends in the direction transverse to the plane of symmetry.

11. The roller assembly of claim 9, further includes a platform supporting the rail and the support.

12. The roller assembly of claim 1, wherein:
    the first support member comprises a first portion and second portion wherein the first portion of the first support member extends along a first side of the first roller and the second portion of the first support member extends along a second side of the first roller; and
    a first axle member extends along a first axis of rotation of the first roller and is supported by the first portion of the first support member, extends through the first roller and extends to and is supported by the second portion of the first support member.

13. The roller assembly of claim 1, wherein:
    the second support member comprises a first portion and second portion wherein the first portion of the second support member extends along a first side of the second roller and the second portion of the second support member extends along a second side of the second roller; and
    a second axle member extends along a second axis of rotation of the second roller and is supported by the first portion of the second support member, extends through the second roller and extends to and is supported by the second portion of the second support member.

14. The roller assembly of claim 1, further includes roller bearings positioned between a first frame member and the first support member wherein:
    the first support member rotates relative to the first frame member; and
    the first support member is connected to a first rotatable drive shaft for rotating the first support member about the third axis of rotation.

15. The roller assembly of claim 14, further includes a first motor connected to the first rotatable drive shaft such that rotating the first support member rotates a first axis of rotation of the first roller about the third axis of rotation.

16. The roller assembly of claim 1, further includes roller bearings positioned between a second frame member and the second support member, wherein:
    the second support member rotates relative to the second frame member; and
    the second support member is connected to a second rotatable drive shaft for rotating the second support member about the fourth axis of rotation.

17. The roller assembly of claim 16, further includes a second motor connected to the second rotatable drive shaft such that rotating the second support member rotates a second axis of rotation of the second roller about the fourth axis of rotation.

18. The roller assembly of claim 1, further includes the first support member is movable along the third axis of rotation and the second support member is movable along the fourth axis of rotation.

19. A method of forming adjacent curved surfaces in a composite gap filler member, comprising the steps of:
positioning a first roller, which is supported by a first support member, in contact with a surface of a support, wherein:
the first roller rotates relative to the first support member about a first axis of rotation; and
the first support member is rotatable about a third axis of rotation, which provides for rotation of the first axis of rotation about the third axis of rotation;
positioning a second roller, which is supported by a second support member, in contact with the surface of the support and in contact with the first roller, wherein:
the second roller rotates relative to the second support member about a second axis of rotation; and
the second support member is rotatable about a fourth axis of rotation, which provides for rotation of the second axis of rotation about the fourth axis of rotation; and
pulling a composite material in contact with and past the first and second rollers wherein the first roller rotates and the second roller rotates; and
rotating the first support member and the first roller about the third axis of rotation and moving at least one of the first roller or second roller relative to other maintaining the first and second rollers in contact with one another and in contact with the surface, wherein:
the first roller, the second roller and the surface of the support define an aperture; and
the first roller defines a first curved side of the aperture having a first radius and the second roller defines a second curved side, adjacent to the first curved side of the aperture, having a second radius such that the first radius and the second radius are unequal.

20. The method of claim 19, wherein the positioning the first roller includes the first roller defining a first curved side having a first radius and positioning the second roller includes the second roller defining a second curved side having a second radius in defining a second aperture such that the first radius equals the second radius.

* * * * *

UNITED STATES PATENT AND TRADEMARK OFFICE
CERTIFICATE OF CORRECTION

| | | |
|---|---|---|
| PATENT NO. | : 11,000,978 B2 | Page 1 of 1 |
| APPLICATION NO. | : 16/178930 | |
| DATED | : May 11, 2021 | |
| INVENTOR(S) | : Paul Reed Stone | |

It is certified that error appears in the above-identified patent and that said Letters Patent is hereby corrected as shown below:

In the Claims

Column 21, Line 23, "rotation; and" should read -- rotation; --.

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*